United States Patent
Cricrì et al.

(10) Patent No.: US 12,323,607 B2
(45) Date of Patent: Jun. 3, 2025

(54) APPARATUS, METHOD AND COMPUTER PROGRAM PRODUCT FOR OPTIMIZING PARAMETERS OF A COMPRESSED REPRESENTATION OF A NEURAL NETWORK

(71) Applicant: Nokia Technologies Oy, Espoo (FI)

(72) Inventors: Francesco Cricrì, Tampere (FI); Hamed Rezazadegan Tavakoli, Espoo (FI); Honglei Zhang, Tampere (FI); Nannan Zou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 77 days.

(21) Appl. No.: 18/001,987

(22) PCT Filed: Jun. 11, 2021

(86) PCT No.: PCT/IB2021/055178
§ 371 (c)(1),
(2) Date: Dec. 15, 2022

(87) PCT Pub. No.: WO2021/255605
PCT Pub. Date: Dec. 23, 2021

(65) Prior Publication Data
US 2023/0269387 A1   Aug. 24, 2023

Related U.S. Application Data

(60) Provisional application No. 63/041,286, filed on Jun. 19, 2020.

(51) Int. Cl.
*H04N 7/12*   (2006.01)
*G06N 3/0455*   (2023.01)
(Continued)

(52) U.S. Cl.
CPC ............ *H04N 19/42* (2014.11); *G06N 3/0455* (2023.01); *G06N 3/0985* (2023.01); *H04N 19/124* (2014.11); *H04N 19/176* (2014.11)

(58) Field of Classification Search
CPC .... H04N 19/42; H04N 19/124; H04N 19/176; G06N 3/0455; G06N 3/0985; G06N 3/045; G06N 3/047
(Continued)

(56) References Cited

U.S. PATENT DOCUMENTS

2019/0155973 A1* 5/2019 Morczinek ............ G01C 11/04
2019/0311259 A1 10/2019 Cricri et al.
(Continued)

FOREIGN PATENT DOCUMENTS

WO   2019/197712 A1   10/2019
WO   2020/008104 A1   1/2020

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Gims S Philippe
(74) *Attorney, Agent, or Firm* — McCarter & English, LLP

(57) ABSTRACT

In example embodiments, an apparatus, a method, and a computer program product are provided. An example apparatus include processing circuitry; and at least one memory including computer program code, the at least one memory and the computer program code configured to, with the processing circuitry, cause the apparatus at least to: overfit a neural network on each media item, from a batch of media items, for a number of iterations to obtain an overfitted
(Continued)

neural network model for the each media item; evaluate the overfitted neural network model on the each media item to obtain evaluation errors; and update parameters of the neural network to be based on the evaluation errors.

17 Claims, 13 Drawing Sheets

(51) Int. Cl.
  *G06N 3/0985* (2023.01)
  *H04N 19/124* (2014.01)
  *H04N 19/176* (2014.01)
  *H04N 19/42* (2014.01)
(58) Field of Classification Search
  USPC .................................................. 375/240.03
  See application file for complete search history.

(56) References Cited

U.S. PATENT DOCUMENTS

| | | | | |
|---|---|---|---|---|
| 2019/0354858 | A1 | 11/2019 | Chrzanowski et al. | |
| 2020/0134461 | A1* | 4/2020 | Chai | G06N 3/084 |
| 2020/0184278 | A1* | 6/2020 | Zadeh | G06N 3/044 |
| 2020/0210824 | A1* | 7/2020 | Poornaki | G05B 23/0221 |
| 2020/0251183 | A1* | 8/2020 | Kashefhaghighi | G16B 40/00 |
| 2021/0056412 | A1* | 2/2021 | Jung | G06N 3/045 |
| 2021/0073612 | A1* | 3/2021 | Vahdat | G06N 3/048 |
| 2022/0164655 | A1* | 5/2022 | Gomez | G06F 16/90335 |

OTHER PUBLICATIONS

"Advanced Video Coding For Generic Audiovisual services", Series H: Audiovisual And Multimedia Systems, Infrastructure of audio-visual services—Coding of moving Video, Recommendation ITU-T H.264, Apr. 2017, 812 pages.

"Versatile Video Coding", Series H: Audiovisual and Multimedia Systems Infrastructure of audiovisual services—Coding of moving video, Recommendation ITU-T H.266, Aug. 2020, 516 pages.

Finn et al., "Model-Agnostic Meta-Learning for Fast Adaptation of Deep Networks", arXiv, Jul. 18, 2017, 13 pages.

Nichol et al., "On First-Order Meta-Learning Algorithms", arXiv, Oct. 22, 2018, pp. 1-15.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Dec. 27, 2022, Webpage available at : https://en.wikipedia.org/wiki/ IEEE 802.11.

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 15: Advanced Video Coding (AVC) File Format", ISO/IEC 14496-15, First edition, Apr. 15, 2004, 29 pages.

Invitation to Pay Additional Fees received for corresponding Patent Cooperation Treaty Application No. PCT/IB2021/055178, dated Sep. 9, 2021, 14 pages.

International Search Report and Written Opinion received for corresponding Patent Cooperation Treaty Application No. PCT/IB2021/055178, dated Nov. 2, 2021, 19 pages.

\* cited by examiner

APPARATUS, METHOD AND COMPUTER PROGRAM PRODUCT FOR OPTIMIZING PARAMETERS OF A COMPRESSED REPRESENTATION OF A NEURAL NETWORK

RELATED APPLICATION

This application claims priority to PCT Application No. PCT/IB2021/055178, filed on Jun. 11, 2021, which claims priority to U.S. Provisional Application No. 63/041,286, filed on Jun. 19, 2020, each of which is incorporated herein by reference in its entirety.

TECHNICAL FIELD

The examples and non-limiting embodiments relate generally to media items, for example, image/video compression, more particularly, to optimizing or updating parameters for a compressed representation of a neural network.

BACKGROUND

It is known to provide standardized formats for exchange of neural networks.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
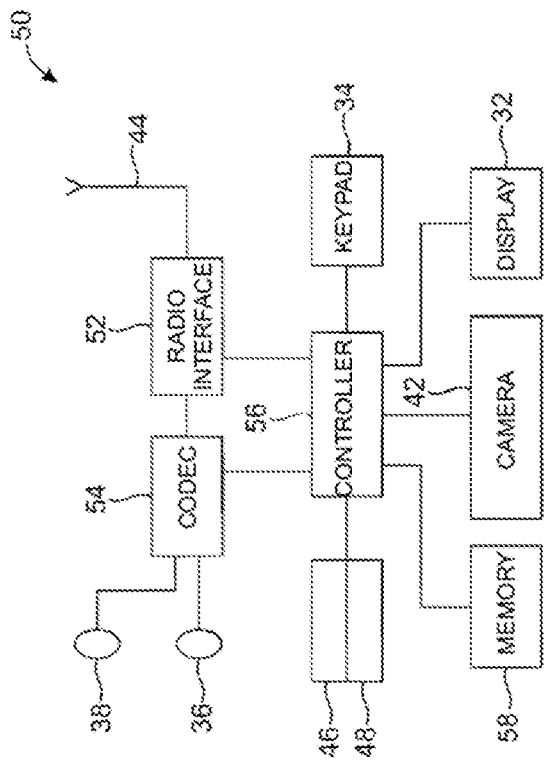
FIG. 1 shows schematically an electronic device employing embodiments of the examples described herein.
Figure 2:
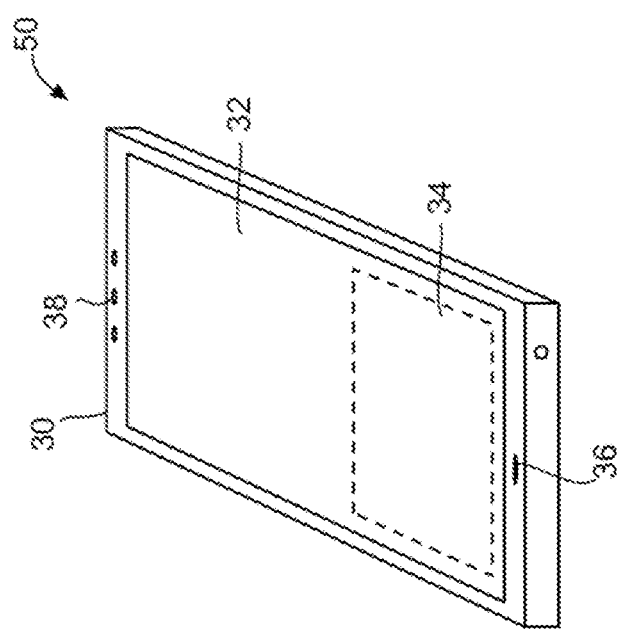
FIG. 2 shows schematically a user equipment suitable for employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
CE core experiment
CU central unit
DASH dynamic adaptive streaming over HTTP
DCT discrete cosine transform
DSP digital signal processor
DU distributed unit
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, for example, a node providing NR user plane and control plane protocol terminations towards the UE, and connected via the NG interface to the 5GC
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
MAML model-agnostic meta learning
mdat MediaDataBox MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
NAL network abstraction layer
NDU NN compressed data unit
ng or NG new generation
ng-eNB or NG-eNB new generation eNB
NN neural network
NNEF neural network exchange format
NNR neural network representation
NR new radio (5G radio)
N/W or NW network
ONNX Open Neural Network eXchange
OPs overfitting parameters
PB protocol buffers
PC personal computer
PDA personal digital assistant
PDCP packet data convergence protocol
PHY physical layer
PID packet identifier
PLC power line communication
PSNR peak signal-to-noise ratio
RAM random access memory
RAN radio access network
RFC request for comments
RFID radio frequency identification
RLC radio link control
RRC radio resource control
RRH remote radio head
RU radio unit
Rx receiver
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
WLAN wireless local area network
X2 interconnecting interface between two eNodeBs in LTE network
Xn interface between two NG-RAN nodes The following describes in detail suitable apparatus and possible mechanisms for a media items, for example, video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving, or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system, or a wireless local area network.

The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
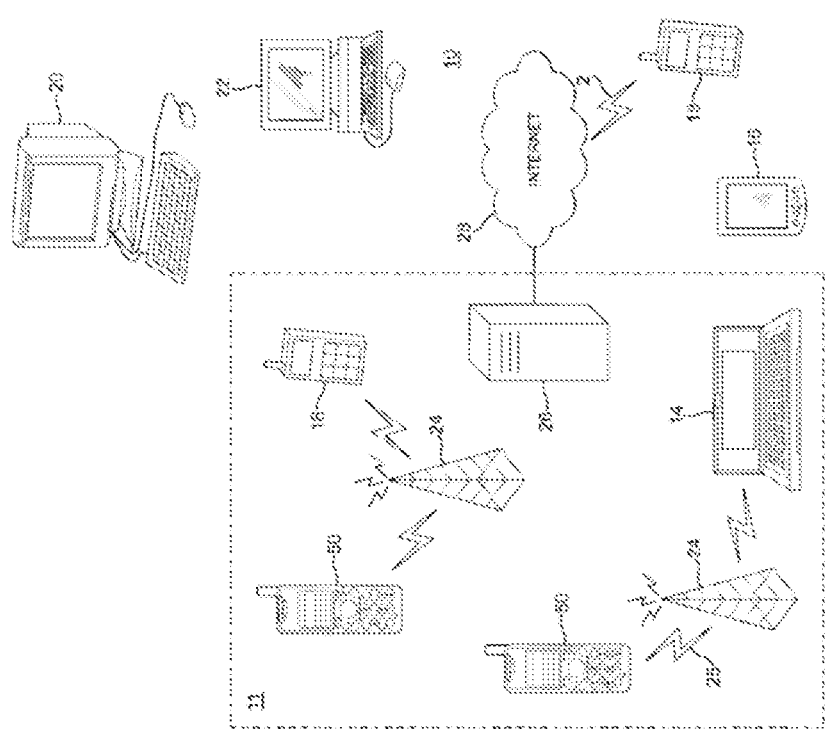
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle, or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form. A video encoder and/or a video decoder may also be separate from each other, for example, need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
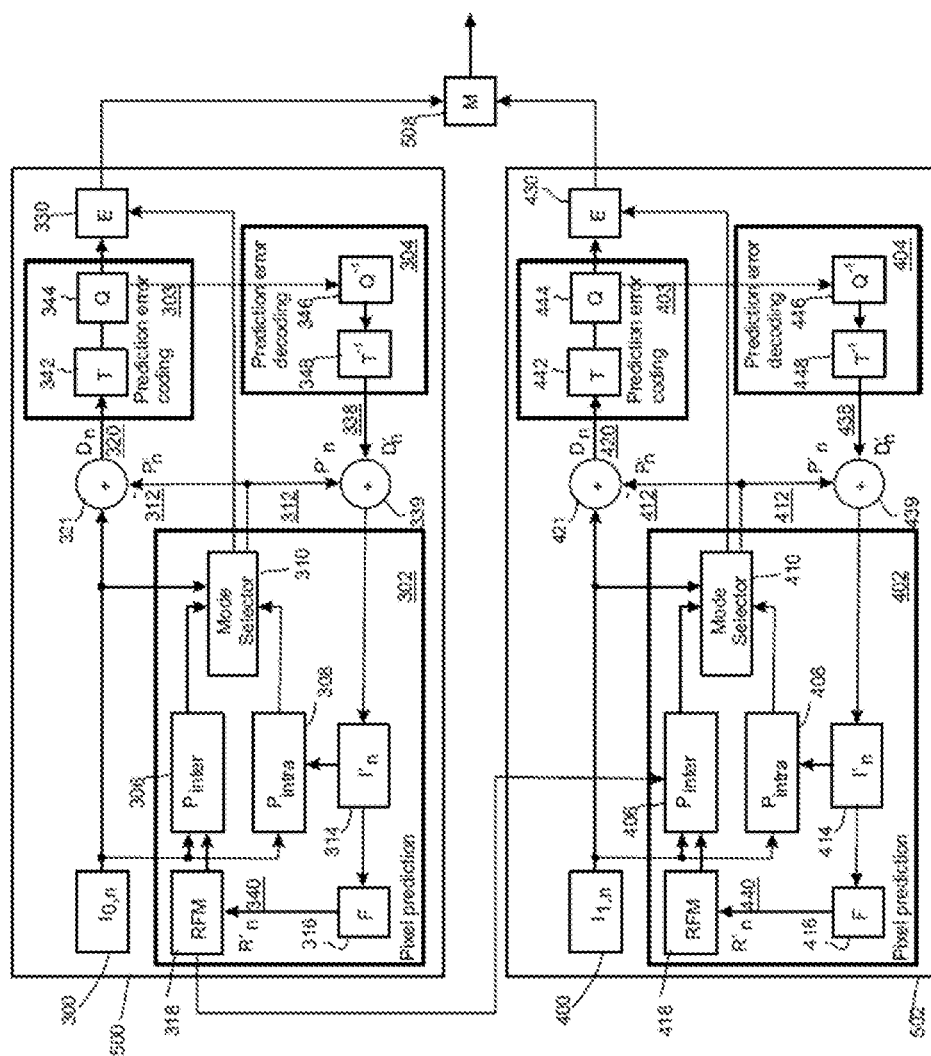
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer images 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives enhancement layer images of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to the filter 316, 416. The filter 316, 416 receiving the preliminary representation may filter the preliminary representation and output a final reconstructed image 340, 440 which may be saved in the reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
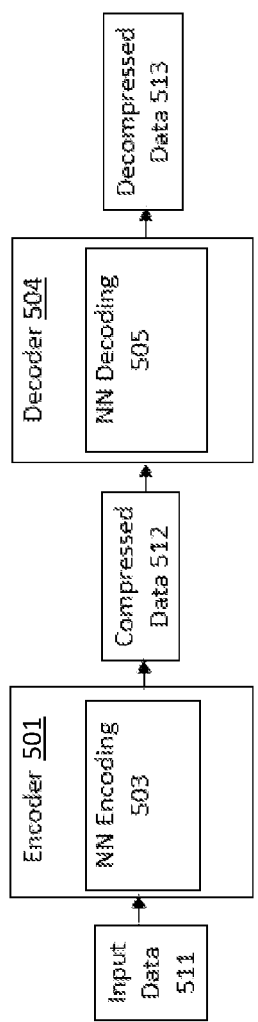
FIG. 5 is a block diagram showing the interface between an encoder and a decoder in accordance with the examples described herein.

FIG. 5 is a block diagram showing the interface between an encoder 501 implementing neural network encoding 503, and a decoder 504 implementing neural network decoding 505 in accordance with the examples described herein. The encoder 501 may embody a device, software method or hardware circuit. Encoder 501 has the goal of compressing input data 511 (for example, an input video) to compressed data 512 (for example, a bitstream) such that the bitrate is minimized, and the accuracy of an analysis or processing algorithm is maximized. To this end, encoder 501 uses an encoder or compression algorithm, for example to perform neural network encoding 503.

The general analysis or processing algorithm may be part of decoder 504. Decoder 504 uses a decoder or decompression algorithm, for example to perform neural network decoding 505 to decode the compressed data 512 (for example, compressed video) which was encoded by encoder 501. Decoder 504 produces decompressed data 513 (for example, reconstructed data).

Encoder 501 and decoder 504 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

Fundamentals of Neural Networks

A neural network (NN) is a computation graph consisting of several layers of computation. Each layer consists of one or more units, where each unit performs an elementary computation. A unit is connected to one or more other units, and a connection may be associated with a weight. The weight may be used for scaling the signal passing through an associated connection. Weights are learnable parameters, for example, values which can be learned from training data. There may be other learnable parameters, such as those of batch-normalization layers.

Two of the most widely used architectures for neural networks are feed-forward and recurrent architectures. Feed-forward neural networks are such that there is no feedback loop, each layer takes input from one or more of the layers before and provides its output as the input for one or more of the subsequent layers. Also, units inside a certain layer take input from units in one or more of preceding layers and provide output to one or more of following layers.

Initial layers, those close to the input data, extract semantically low-level features, for example, edges and textures in images, and intermediate and final layers extract more high-level features. After the feature extraction layers there may be one or more layers performing a certain task, for example, classification, semantic segmentation, object detection, denoising, style transfer, super-resolution, and the like. In recurrent neural networks, there is a feedback loop, so that the neural network becomes stateful, for example, it is able to memorize information or a state.

Neural networks are being utilized in an ever-increasing number of applications for many different types of devices, for example, mobile phones, chat bots, IoT devices, smart cars, voice assistants, and the like. Some of these applications include, but are not limited to, image and video analysis and processing, social media data analysis, device usage data analysis, and the like.

An important property of neural networks, and other machine learning tools, is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, and the like. In recent deep learning techniques, training is an iterative process, where at each iteration the algorithm modifies the weights of the neural net to make a gradual improvement of the network's output, for example, to gradually decrease the loss.

In various embodiments and throughout the description, terms "model", "neural network", "neural net" and "network" may be used interchangeably, and also the weights of neural networks are sometimes referred to as learnable parameters or simply as parameters.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, for example, data which was not used for training the model. This is usually referred to as generalization. In practice, data is usually split into at least two sets, the training set, and the validation set. The training set is used for training the network, for example, to modify its learnable parameters in order to minimize the loss. The validation set is used for checking the performance of the network on data, which was not used to minimize the loss, as an indication of the final performance of the model. In particular, the errors on the training set and on the validation set are monitored during the training process to understand the following things:

If the network is learning at all—in this case, the training set error should decrease, otherwise the model is in the regime of underfitting.

If the network is learning to generalize—in this case, also the validation set error needs to decrease and to be not too much higher than the training set error. In an embodiment, this may depend upon the application or task. For example, in case of classification task, an error of 40% may be too high for some applications. In general, low, and thus satisfactory classification errors may be 1% to 20%. If the training set error is low, but the validation set error is much higher than the training set error, or it does not decrease, or it even increases, the model is in the regime of overfitting. In some embodiments, low error may be interpreted as satisfactory or acceptable, for a given application or task. For example, for classification, a low training error may be 1% to 20% of classification error. In another embodiments, validation set error may be much higher than training error when it is not anymore satisfactory given the application or task, such as 40% or higher.

This means that the model has just memorized the training set's properties and performs well only on that set, but performs poorly on a set not used for tuning or training its parameters.

Lately, neural networks have been used for compressing and de-compressing data or media items, for example, images. The most widely used architecture for such task is the auto-encoder, which is a neural network consisting of two parts: a neural encoder and a neural decoder. In various embodiments, these neural encoder and neural decoder would be referred to as encoder and decoder, even though these refer to algorithms which are learned from data instead of being tuned manually. The encoder takes an image as an input and produces a code, to represent the input image, which requires less bits than the input image. This code may have obtained by a binarization or quantization process after the encoder. The decoder takes in this code and reconstructs the image which was input to the encoder.

Such encoder and decoder are usually trained to minimize a combination of bitrate and distortion, where the distortion is usually mean squared error (MSE), peak signal to noise ratio (PSNR), structural similarity (SSIM) index, or similar metrics. These distortion metrics are meant to be inversely proportional to the human visual perception quality.

Fundamentals of Video/Image Coding

Video codec consists of an encoder that transforms the input video into a compressed representation suited for storage/transmission and a decoder that can decompress the compressed video representation back into a viewable form. Typically, an encoder discards some information in the original video sequence in order to represent the video in a more compact form, for example, at lower bitrate.

Typical hybrid video codecs, for example ITU-T H.263 and H.264, encode the video information in two phases. Firstly, pixel values in a certain picture area (or "block") are predicted. In an example, the pixel values may be predicted by using motion compensation algorithm. This prediction technique includes finding and indicating an area in one of the previously coded video frames that corresponds closely to the block being coded. In other example, the pixel values may be predicted by using spatial prediction techniques. This prediction technique uses the pixel values around the block to be coded in a specified manner. Secondly, the prediction error, for example, the difference between the predicted block of pixels and the original block of pixels is coded. This is typically done by transforming the difference in pixel values using a specified transform, for example, discrete cosine transform (DCT) or a variant of it; quantizing the coefficients; and entropy coding the quantized coefficients. By varying the fidelity of the quantization process, encoder can control the balance between the accuracy of the pixel representation, for example, picture quality and size of the resulting coded video representation, for example, file size or transmission bitrate.

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction techniques similar to the encoder to form a predicted representation of the pixel blocks. For example, using the motion or spatial information created by the encoder and stored in the compressed representation and prediction error decoding, which is inverse operation of the prediction error coding recovering the quantized prediction error signal in spatial pixel domain. After applying prediction and prediction error decoding techniques the decoder sums up the prediction and prediction error signals, for example, pixel values to form the output video frame. The decoder and encoder can also apply additional filtering techniques to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded in the encoder side or decoded in the decoder side and the prediction source block in one of the previously coded or decoded pictures. In order to represent motion vectors efficiently those are typically coded differentially with respect to block specific predicted motion vectors. In typical video codecs the predicted motion vectors are created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs, the prediction residual after motion compensation is first transformed with a transform kernel, for example, DCT and then coded. The reason for this is that often there still exists some correlation among the residual and transform can in many cases help reduce this correlation and provide more efficient coding.

Typical video encoders utilize Lagrangian cost functions to find optimal coding modes, for example, the desired Macroblock mode and associated motion vectors. This kind of cost function uses a weighting factor λ to tie together the exact or estimated image distortion due to lossy coding methods and the exact or estimated amount of information that is required to represent the pixel values in an image area:

$$C = D + \lambda R \qquad \text{equation 1}$$

In equation 1, C is the Lagrangian cost to be minimized, D is the image distortion, for example, mean squared error with the mode and motion vectors considered, and R is the number of bits needed to represent the required data to reconstruct the image block in the decoder including the amount of data to represent the candidate motion vectors.

Information on Neural Network Based Image/Video Coding

Recently, neural networks (NNs) have been used in the context of image and video compression, by following mainly two approaches.

In one approach, NNs are used to replace one or more of the components of a traditional codec such as VVC/H.266. Here, by 'traditional', it is meant, those codecs whose components and their parameters are typically not learned from data. Some examples of such components, include but are not limited to:

Additional in-loop filter, for example by having the NN as an additional in-loop filter with respect to the traditional loop filters.
Single in-loop filter, for example by having the NN replacing all traditional in-loop filters.
Intra-frame prediction.
Inter-frame prediction.
Transform and/or inverse transform.
Probability model for the arithmetic codec.

Figure 6:
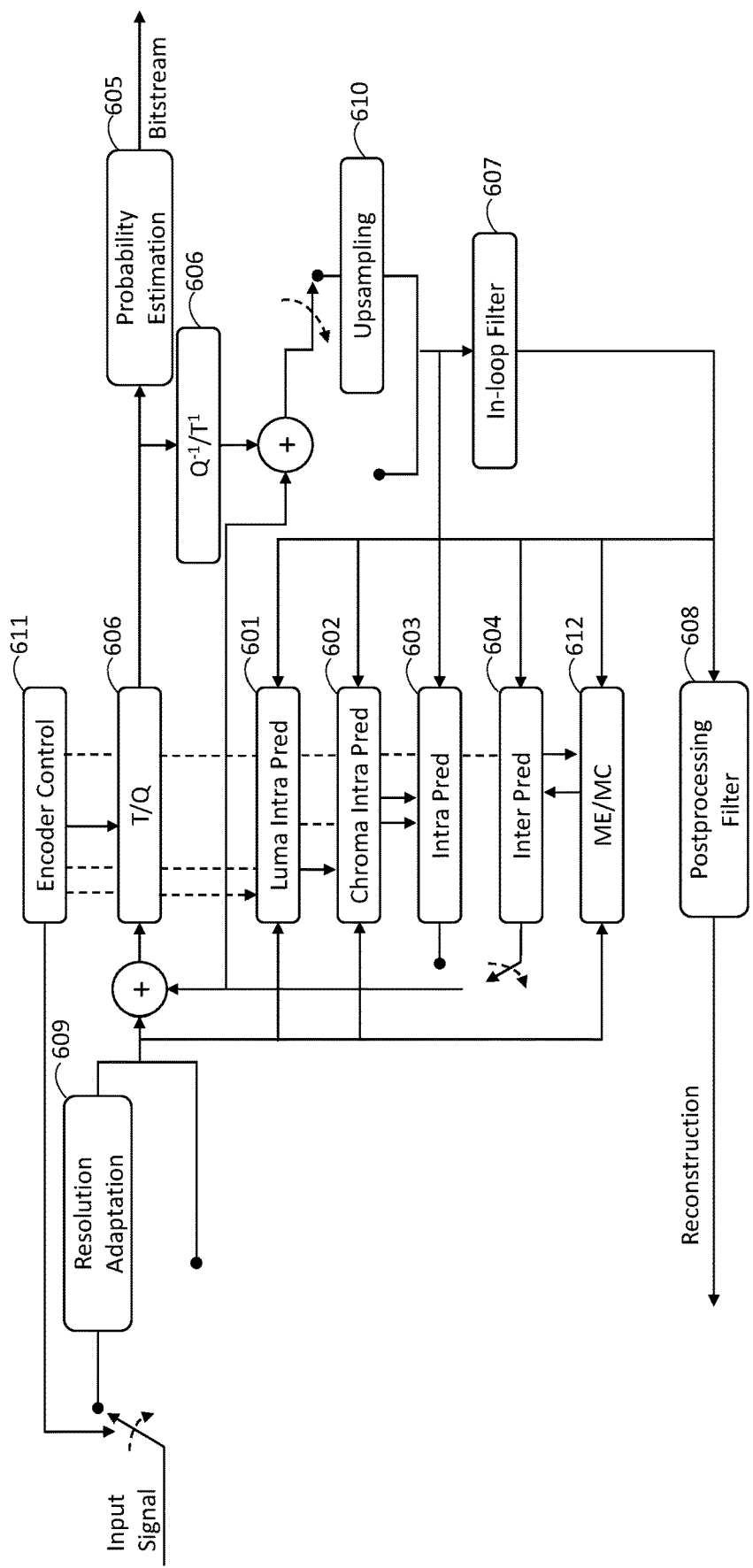
FIG. 6 illustrates examples of functioning of NNs as components of a traditional codec's pipeline.

FIG. 6 figure illustrates examples of functioning of NNs as components of a traditional codec's pipeline. In particular, FIG. 6 illustrates an encoder, which also includes a decoding loop. FIG. 6 is shown to include components described below:

A luma intra pred block or circuit 601. This block or circuit performs intra prediction in the luma domain, for example, by using already reconstructed data from the same frame. The operation of the luma intra pred block or circuit 601 may be performed by a deep neural network such as a convolutional auto-encoder.

A chroma intra pred block or circuit 602. This block or circuit performs intra prediction in the chroma domain, for example, by using already reconstructed data from the same frame. The chroma intra pred block or circuit 602 may perform cross-component prediction, for example, predicting chroma from luma. The operation of the chroma intra pred 602 may be performed by a deep neural network such as a convolutional auto-encoder.

An intra pred block or circuit 603 and an inter-pred block or circuit 604. These blocks or circuit perform intra prediction and inter-prediction, respectively. The intra pred block or circuit 603 and the inter-pred block or circuit 604 may perform the prediction on all components, for example, luma and chroma. The operations of the intra pred block or circuit 603 and the inter-pred block or circuit 604 may be performed by two or more deep neural networks such as convolutional auto-encoders.

A probability estimation block or circuit 605 for entropy coding. This block or circuit performs prediction of probability for the next symbol to encode or decode, which is then provided to the entropy coding module, such as the arithmetic coding module, to encode or decode the next symbol. The operation of the probability estimation block or circuit 605 may be performed by a neural network.

A transform and quantization block or circuit 606. These are actually two blocks or circuits. The transform and quantization block or circuit 606 may perform a transform of input data to a different domain, for example, the FFT transform would transform the data to frequency domain. The transform and quantization block or circuit 606 may quantize its input values to a smaller set of possible values. In the decoding loop, there may be inverse quantization block or circuit and inverse transform block or circuit. One or both of the transform block or circuit and quantization block or circuit may be replaced by one or two or more neural networks. One or both of the inverse transform block or circuit and inverse quantization block or circuit may be replaced by one or two or more neural networks.

An in-loop filter block or circuit 607. Operations of the in-loop filter block or circuit 607 is performed in the decoding loop, and it performs filtering on the output of the inverse transform block or circuit, or anyway on the reconstructed data, in order to enhance the reconstructed with respect to one or more predetermined quality metrics. This filter may affect both the quality of the decoded and the bitrate of the bitstream output by the encoder. The operation of the in-loop filter block or circuit 607 may be performed by a neural network, such as a convolutional auto-encoder. In examples, the operation of the in-loop filter may be performed by multiple steps or filters, where the one or more steps may be performed by neural networks.

A post-processing filter block or circuit 608. The post-processing filter block or circuit 608 may be performed only at decoder side, as it may not affect the encoding process. The post-processing filter block or circuit 608 filters the reconstructed data output by the in-loop filter block or circuit 607, in order to enhance the reconstructed data. The post-processing filter block or circuit 608 may be replaced by a neural network, such as a convolutional auto-encoder.

A resolution adaptation block or circuit 609: this block or circuit may downsample the input video frames, prior to encoding. Then, in the decoding loop, the reconstructed data may be upsampled, by an upsampling block or circuit 610, to the original resolution. The operation of the resolution adaptation block or circuit 609 block or circuit may be performed by a neural network such as a convolutional auto-encoder.

An encoder control block or circuit 611. This block or circuit performs optimization of encoder's parameters, such as what transform to use, what quantization parameters (QP) to use, what intra-prediction mode (out of N intra-prediction modes) to use, and the like. The operation of the encoder control block or circuit 611 may be performed by a neural network, such as a classifier convolutional network, or such as a regression convolutional network.

Figure 7:
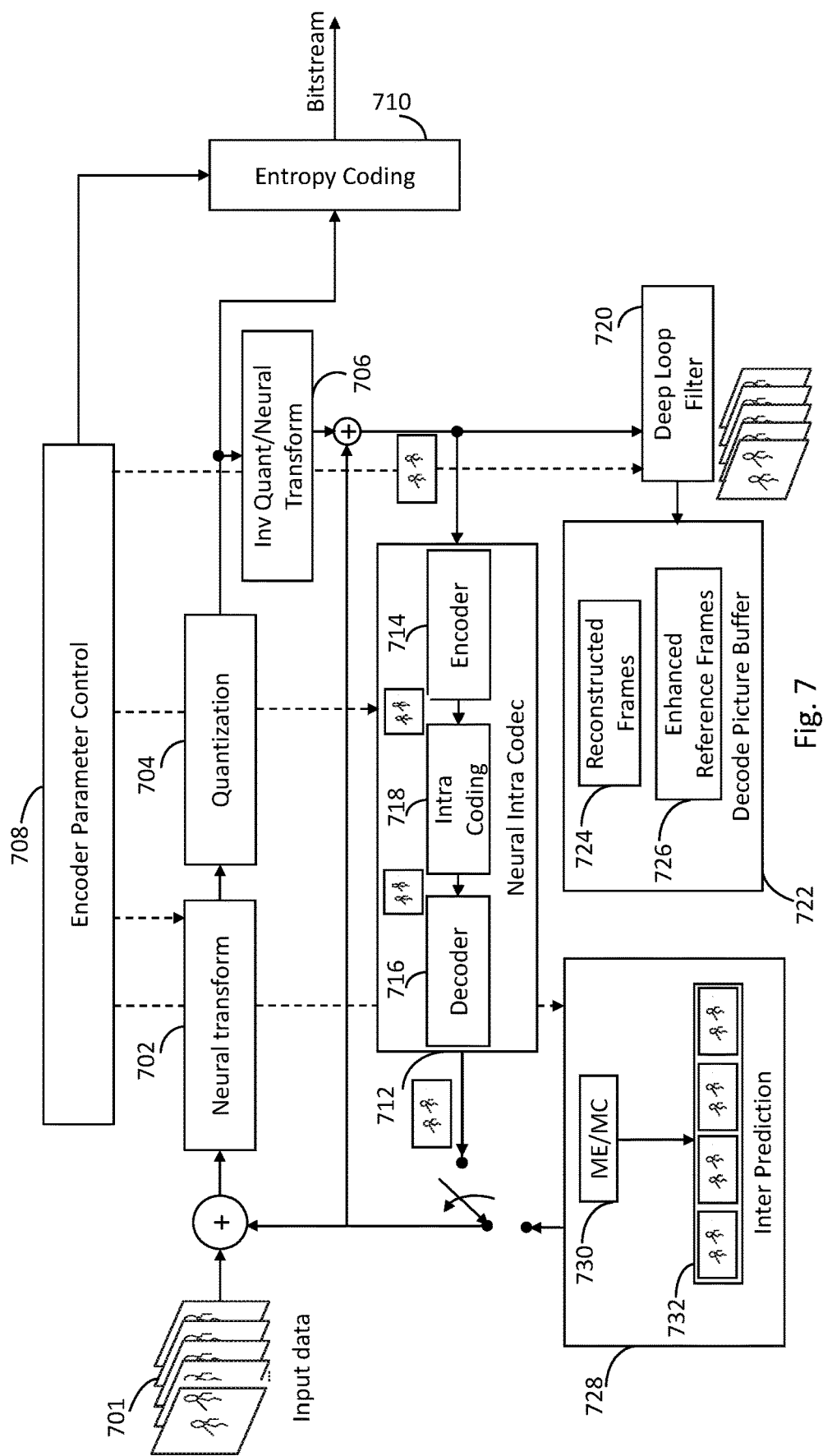
FIG. 7 illustrates an example of modified video coding pipeline based on neural network.

In another approach, commonly referred to as 'end-to-end learned compression', NNs are used as the main components of the image/video codecs. In this second approach, there are two main options:

Option 1: re-use the video coding pipeline but replace most or all the components with NNs. Refer to FIG. 7 illustrates an example of modified video coding pipeline based on neural network. An example of neural network may include, but is not limited, a compressed representation of a neural network. FIG. 7 is shown to include following components:

A neural transform block or circuit 702: this block or circuit performs a transform of an input data 701 to a new representation of that data, which may have lower entropy and thus be more compressible.

A quantization block or circuit 704: this block or circuit quantizes the input data to a smaller set of possible values.

An inverse transform and inverse quantization blocks or circuits 706. These blocks or circuits perform the inverse or approximately inverse operation of the transform and the quantization, respectively.

An encoder parameter control block or circuit 708. This block or circuit may control and optimize some or all the parameters of the encoding process, such as parameters of one or more of the encoding blocks or circuits.

An entropy coding block or circuit 710. This block or circuit may perform lossless coding, for example based on entropy. One popular entropy coding technique is arithmetic coding.

A neural intra codec block or circuit 712. This block or circuit may be an image compression and decompression block or circuit, which may be used to encode and decode an intra frame. An encoder 714 may be an encoder block or circuit, such as the neural encoder part of an auto-encoder neural network. A decoder 716 may be a decoder block or circuit, such as the neural decoder part of an auto-encoder neural network. An intra coding block or circuit 718 may be a block or circuit performing some intermediate steps between encoder and decoder, such as quantization, entropy encoding, entropy decoding, and/or inverse quantization.

A deep loop filter block or circuit 720. This block or circuit performs filtering of reconstructed data, in order to enhance it.

A decode picture buffer block or circuit 722. This block or circuit is a memory buffer, keeping the decoded frame, for example, reconstructed frames 724 and enhanced reference frames 726 to be used for inter prediction.

An inter-prediction block or circuit 728. This block or circuit performs inter-frame prediction, for example, predicts from frames, for example, frames 732, which are temporally nearby. An ME/MC 730 performs motion estimation and/or motion compensation, which are two key operations to be performed when performing inter-frame prediction. ME/MC stands for motion estimation/motion compensation.

Option 2: re-design the whole pipeline, as follows. Option 2 is described in detail in FIG. 8.

Encoder NN: performs a non-linear transform

Quantization and lossless encoding of the encoder NN's output.

Lossless decoding and dequantization.

Decoder NN: performs a non-linear inverse transform.

Figure 8:
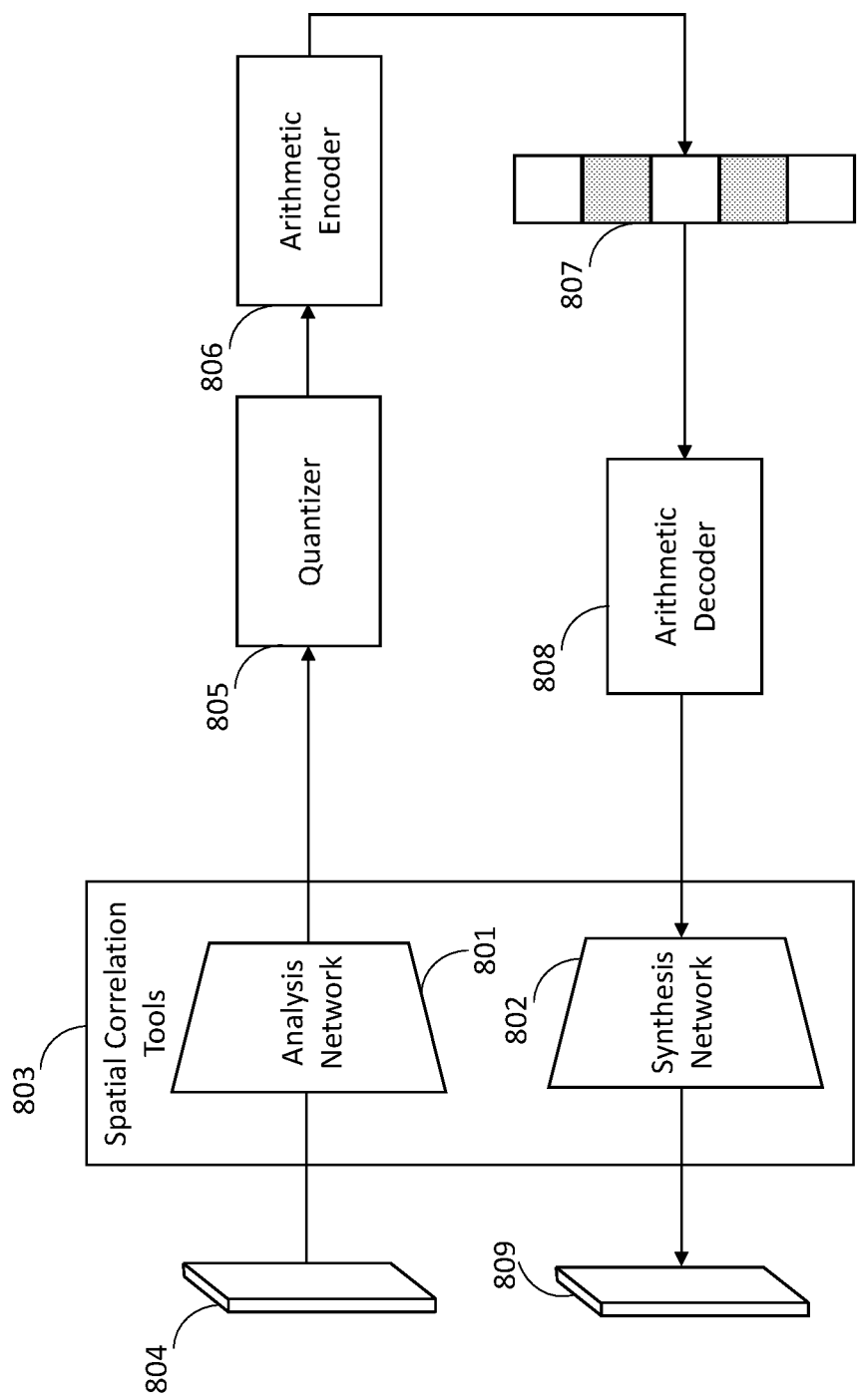
FIG. 8 depicts an encoder and a decoder NNs being parts of a neural auto-encoder architecture, in accordance with an example.

FIG. 8 depicts an encoder and a decoder NNs being parts of a neural auto-encoder architecture, in accordance with an example. In FIG. 8, an analysis Network 801 is an encoder NN, and a synthesis network 802 is a decoder NN, which may together be referred to as spatial correlation tools 803, or as neural auto-encoder.

In Option 2, the input data 804 is analyzed by the encoder NN, e.g. the analysis network 802, which outputs a new representation of that input data. The new representation may be more compressible. This new representation may then be quantized, by a quantizer 805, to a discrete number of values. The quantized data may be then lossless encoded, for example, by an arithmetic encoder 806, thus obtaining a bitstream 807. The FIG. 8 includes an arithmetic decoder 808. On the decoding side, the bitstream is first lossless decoded, for example, by using the arithmetic decoder 808. The lossless decoded data is dequantized and then input to the Decoder NN, Synthesis Network 803. The output is the reconstructed or decoded data 809.

In case of lossy compression, the lossy steps may comprise the Encoder NN and/or the quantization.

In order to train the neural networks this system, a training objective function, referred to as "training loss") is typically utilized, which usually comprises one or more terms, or loss terms, or simply losses. Although here the Option 2 and FIG. 8 considered as example for describing the training objective function, a similar training objective function may also be used for training the neural networks for the systems in FIG. 6 and FIG. 7. In one example, the training loss comprises a reconstruction loss 816 term and a rate loss term. The reconstruction loss 816 encourages the system to decode data that is similar to the input data, according to some similarity metric. Examples of reconstruction losses are:

a loss derived from mean squared error (MSE).

a loss derived from multi-scale structural similarity (MS-SSIM), such as 1 minus MS-SSIM, or 1-MS-SSIM.

Losses derived from the use of a pretrained neural network. For example, error (f1, f2), where f1 and f2 are the features extracted by a pretrained neural network for the input (uncompressed) data and the decoded (reconstructed) data, respectively, and error( ) is an error or distance function, such as L1 norm or L2 norm.

Losses derived from the use of a neural network that is trained simultaneously with the end-to-end learned codec. For example, adversarial loss can be used, which is the loss provided by a discriminator neural network that is trained adversarially with respect to the codec, following the settings proposed in the context of generative adversarial networks (GANs) and their variants.

The rate loss encourages the system to compress the output of the encoding stage, such as the output of the arithmetic encoder 806. "Compressing" for example, means reducing the number of bits output by the encoding stage.

When an entropy-based lossless encoder is used, such as the arithmetic encoder 806, the rate loss typically encourages the output of the Encoder NN to have low entropy. The rate loss may be computed on the output of the Encoder NN, or on the output of the quantization operation, or on the output of the probability model. Example of rate losses are the following:

A differentiable estimate of the entropy.

A sparsification loss, for example, a loss that encourages the output of the Encoder NN or the output of the quantization to have many zeros. Examples are L0 norm, L1 norm, L1 norm divided by L2 norm.

A cross-entropy loss applied to the output of a probability model, where the probability model may be a NN used to estimate the probability of the next symbol to be encoded by the arithmetic encoder 806.

One or more of reconstruction losses may be used, and one or more of the rate losses may be used. All the loss terms may then be combined for example as a weighted sum to obtain the training objective function. Typically, the different loss terms are weighted using different weights, and these weights determine how the final system performs in terms of rate-distortion loss. For example, if more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

For the sake of explanation, images are considered as data type in various embodiments. However, it would be understood that the embodiments are also applicable to other media items, for example videos and audio data.

Information on Meta Learning and MAML

MAML stands for model-agnostic meta-learning and is one popular meta-learning technique in the machine learning literature. Meta-learning refers to the set of techniques that allow a model to "learn to learn" to solve tasks, as opposed to the simpler, and more common, case of just learning to solve tasks. The main difference is that the goal of meta-learning is to train a system to learn new tasks or adapt to new tasks more easily and/or faster.

The current most popular learning algorithms are based on gradient-descent, where a derivative of the error or loss is computed with respect to the parameters of the neural network, and then a gradient-descent step is performed by subtracting the gradients from the current values of the parameters, for example, as described in the following equation:

$$\text{new\_params} = \text{old\_params} - \text{LR} * \text{grads}(\text{loss}(\text{old\_params}))$$

In the above equation, new_params are the updated parameters after the gradient descent step, old_params are the previous parameters, for example, before the gradient descent step, LR is the learning rate which may be a scalar value controlling the speed of the update, and grads is the gradients of the loss with respect to the parameters, where the loss is computed based on the old parameters. In the above equation, loss(old_params) indicates that the loss is computed by using a neural network parametrized by old_params.

This is known as the Stochastic Gradient Descent technique to update parameters. However, there exist more advanced techniques, such as Adam, RMSprop, and the like.

The derivative or gradient is usually computed by back-propagation technique, in neural networks.

In meta-learning, it is often the case that second-order derivatives need to be computed, as the goal is to learn-to-learn. A derivative over the update process is computed, and as the update process itself involves the computation of a derivative, in the end a derivative of a derivative is computed, which is a second order derivative, for example as described in the following equations:

$$\text{meta\_new\_params} = \text{old\_params} - \text{LR} * \text{grads}(\text{loss}(\text{new\_params}))$$

$$\text{meta\_new\_params} = \text{old\_params} - \text{LR} * \text{grads}(\text{loss}(\text{old\_params} - \text{LR} * \text{grads}(\text{loss}(\text{old\_params})))))$$

Techniques based on MAML are typically used for few-shots learning. In few-shots learning, which usually considers classification problems, the goal is to train a NN so that, at inference time, the NN is able to learn a classification task from few examples per class of that classification task. A classification task is usually defined by a certain dataset and/or a certain set of classes from that dataset. For example, learning a set of classes from ImageNet dataset is one task, and learning a set of classes from CIFAR10 dataset is another task. Usually, in traditional machine learning, it's not possible to train a NN from very few training examples per class, as the NN will overfit to those few training examples and will not be able to generalize to unseen test samples of that class. However, in MAML-based few-shots learning, the NN is explicitly trained to learn from few training examples and to still generalize on the test samples. In the MAML approach, the NN is trained so that its parameters represent a good initialization NN, that can then be finetuned at inference time by training on few examples of a new class for few finetuning iterations. So, one advantage of MAML is the speed of convergence, for example, it requires few finetuning iterations. Another advantage of MAML is the generalization capability, for example, it is able to achieve high classification accuracy on unseen test samples. MAML training comprises two nested loops:

Inner loop over selected tasks:

Select a batch of B tasks, where the batch represents a subset of tasks out of all available tasks. Perform a loop over these selected tasks. Each task is associated to training examples and test samples.

For each of the B tasks, where each task is identified by an index b, perform an inner-loop iteration which comprises a finetuning stage and an evaluation stage:

Finetuning stage: consider a neural network model, which may also be referred to as main model in some embodiments, which is parametrized by parameters Theta_i, where i in the index of the outer loop iteration. Theta_i may correspond to old_params in the equation described above. Finetune the neural network using K training examples, and a certain number of finetuning iterations, for example one iteration. To this end, first compute a loss, then compute derivatives of the loss with respect to the model's parameters, then update the parameters by using the computed derivatives. As a result, obtain a neural network parametrized by parameters Theta_i_b, where b is the index of the considered task, out of all B tasks in the batch. Theta_i_b may correspond to new_params in the equation described above.

Evaluation stage: by using the updated neural network parametrized by Theta_i_b, evaluate the performance of the NN on that task using some unseen test images from that task, and obtain a loss.

As a result, B losses are obtained, one loss for each selected task.

Outer loop:
Update the main model parametrized by parameters Theta_i based on the B losses from the inner loop's evaluation. To this end, compute the derivatives of the losses with respect to the main model's parameters, and then use these derivatives for updating the main model's parameters. As a result, obtain an updated model parametrized by parameters Theta_(i+1). Theta_(i+1) may correspond to meta_new_params in the equation described above.

Based on how the outer loop update is performed, there are two versions of MAML:

One version comprises using 2nd order derivatives: the derivative in the outer loop is computed through the inner loop's updates, thus computing 2nd order derivatives. As described in the following equation, old_params are the parameters of the model in the inner loop before being updated, whereas meta_new_params are the updated parameters in the output loop:

meta_new_params=old_params−LR*grads
(loss(old_params−LR*grads(loss(old_params))))

Another version comprises using 1st order derivatives, this is an approximation of the 2nd order derivatives case: the derivative in the outer loop is computed as the derivative of the inner loop's evaluation losses by considering the inner loop's gradients to be constant. Thus, only first order derivatives are computed.

In various embodiments, for the sake of simplicity, consider the end-to-end learned compression approach using the redesigned pipeline that has been described in previous paragraphs (option 2). In various embodiments, images are considered as an example of media item or type of data.

The phase when a codec or neural network are deployed and used is referred to as inference phase or test phase in various embodiments. Normally, at inference phase (for example, once the model is trained), the input image is passed through the encoding stages, for example, an encoder NN, a quantizer, and an arithmetic encoder, to obtain a bitstream and send it to the decoder side for decoding. The encoder NN is run in inference mode, for example, one forward pass of the encoder NN is performed. Normally, a deployed codec or neural network are not trained or finetuned during the inference phase. In some cases, a deployed codec or neural network may be updated with new versions of the codec or neural network, for example every few weeks or months.

However, in some other end-to-end learned techniques, at inference time the encoder device may decide to optimize some parameters with respect to the specific content that is being encoded. In an example, the encoder device may include an encoder neural network, quantizer and other devices required during the encoding phase. Some options for the parameters to optimize may be:

Some or all of the encoder's trainable parameters or weights

The output of the encoder, for example, the latent tensor. This may be the tensor before or after the quantization process.

Some or all of the decoder's trainable parameters or weights.

The optimization may consist of using the output of the encoder and decoder for computing a loss function similar to the loss function used during training, and then differentiating it with respect to the parameters to be optimized, for example, one or more of the three above mentioned options. This optimization may be referred to also as finetuning or overfitting, in various embodiments.

In an example, in case of optimizing the decoder's trainable parameters, a subset of those parameters may be considered. The update needs to be signaled to the decoder-side, and thus represents a bitrate overhead. In an embodiment, the subset includes a smaller number of parameters than a full set of parameters (e.g. a set including all parameters). In another embodiment, the subset may include all parameters (e.g. full set of parameters), for example, when substantial compression or quantization is used.

In some examples, the encoder and decoder NNs are not initially trained for the purpose of being later optimized/finetuned at test time. This may result in suboptimal finetuning process.

Various embodiments described herein, propose to initially train the encoder and decoder NNs to be optimal for performing further learning or finetuning at test phase. For example, when the encoder-side device overfits some of parameters to the content that needs to be encoded. In other words, during the training phase or during a fine-tuning phase, the NNs need to 'learn to learn to compress and reconstruct' a content that is provided at inference phase, by leveraging the meta-learning paradigm. The proposed training procedure that leverages meta-learning may be performed either on randomly initialized neural networks, or may be performed on neural networks which were initially trained by a more conventional training approach that does not leverage meta-learning, or may be performed on neural networks of which some neural networks are randomly initialized and some other neural networks were initially trained by a more conventional training approach that does not leverage meta-learning.

During meta-learning, first one or more sets of parameters to be overfitted to a content being encoded are selected. For example, the latent tensor output by the encoder and the decoder NN's bias terms. Thereafter, the NNs are trained by adopting meta-learning. In particular, as an example meta-learning technique, MAML is utilized. Accordingly, in an example embodiment, the meta-learning consists of following two nested training loops:

Inner loop, over a selected batch of images. For each iteration b in the inner loop, select one image from the batch of B images and perform the following steps:

Consider a model parametrized by parameters Theta_i, where i is the index of the outer loop iteration. Perform overfitting on each image in the batch for a number of iterations, obtaining one overfitted model per image. The overfitted model is parametrized by an updated version of Theta_i, that may be referred to as Theta_i_b, where b is the index of the selected image in the batch. Both reconstruction and compression losses may be considered during overfitting. The parameters to be overfitted need to take into account the compression use case, accordingly, only a subset of decoder side parameters may be overfitted.

Evaluate the overfitted model on the same image to which it was overfitted. So, for each overfitted model, the image used for overfitting and the image used for evaluation may be the same image.

Outer loop:
At each iteration i of the outer loop, perform a training iteration on a model parametrized by parameters Theta_i, by using the evaluation errors from the inner loop. The parameters of the model are updated, for example, the encoder NN's and decoder NN's parameters.

Some examples of parameters, to be overfitted, may include:

The encoder NN's parameters.

The latent tensor output by the encoder NN or by the quantizer.

Some of the decoder NN's parameters. One example is the bias terms of the convolutional layers. Another example is the bias terms of the fully-connected layers. Another example is the attention-multipliers in the case of using attention mechanism in the decoder NN's architecture. Another example is a vector from which bias term may be derived by multiplying the vector by a weight matrix at decoder side.

Depending on the parameters which are selected to be overfitted, a different meta-learning procedure may be adopted. For example, in the case of meta-learning to overfit the latent tensor, in one embodiment, in each training iteration the following two stages may need to be performed:

1. Run the encoder in order to obtain an initial latent tensor; and
2. Perform meta-learning by overfitting that initial latent tensor in the inner loop, and update the model in the outer loop based on the performance of the inner loop's tensor overfitting.

Furthermore, in some cases it is possible to perform only first-order meta-learning, whereas in some other cases it is possible to perform either first order or second order meta-learning.

Preliminaries

Some embodiments may distinguish between an encoder side and a decoder side, which may be two physical or abstract entities, such as for example two separate devices, or two separate sub-devices hosted on the same device. The encoder side includes encoding components, such as the encoder NN, a quantizer, an arithmetic encoder, and the like. The encoder side may also include decoding components, such as an arithmetic decoder, a dequantizer, a decoder NN. The decoder side include the decoding components.

In an embodiment, the encoder side device and the decoder side device are assumed to have the computational, memory and power capabilities to run neural networks. In this embodiment, the encoder side device is assumed to have the computational, memory and power capabilities to train neural networks.

In another embodiment, the encoder side device and the decoder side device may, in parts, use cloud computing to run the neural networks. In this embodiment, the encoder side may, in parts, use cloud computing to train neural networks.

Example Embodiments, Setup, and Procedures

In an embodiments, there are two main phases, for example, a training phase and an inference or test phase. The training phase is the development phase of the codec. After that, the codec is deployed to devices: the whole codec may be deployed to the encoder-side devices, including means or circuits to perform the test-phase overfitting, whereas only the decoder side components may be deployed to the decoder-side devices. Once the encoding and decoding components are deployed to devices, it is still possible that the entity or service which developed the codec would later update some of the encoding components and/or decoding components, for example, by updating some of the neural networks.

Initially, a set of Overfitting Parameters (OPs) are selected. These can be some of the neural networks' parameters, or an intermediate output of one of the neural networks. In various embodiments, following examples of Overfitting Parameters, and any combination thereof:

One or more of the Encoder NN's parameters. These may be the parameters of the convolutional layers, the parameters of the fully connected layers, and/or the parameters of the batch-normalization layers, and the like.

For simplicity, the output of the Encoder NN, or the output of the quantizer may be referred to as "latent tensor", which is a common term in the context of auto-encoders.

One or more of the Decoder NN's parameters, may be the parameters of the convolutional layers, the parameters of the fully-connected layers, the parameters of the batch-normalization layers, and the like. However, as one goal of compression is to limit the bandwidth needed to reconstruct some data, in some embodiments, it is not possible to overfit all or many Decoder NN's parameters, because these would then need to be included into the bitstream together with the arithmetic encoded latent tensor. Accordingly, a limited subset of Decoder NN's parameters may be overfitted. Following three options are proposed as examples. In one example, the subset of Decoder NN's parameters comprises the bias terms of some or all the convolutional layers and/or of some or all the fully connected layers in the Decoder NNs. In another example, the subset of the Decoder NN's parameters comprises a set of scalar values that act as gates or attention-multipliers in specifically designed blocks or circuits used in the Decoder NN. In another example, the subset of Decoder NN's parameters comprises the bias terms of some or all the convolutional layers and/or of some or all the fully connected layers in the Decoder NNs, but the bias terms are derived from a vector and a matrix, where the vector is overfitted and then multiplied by a matrix.

Figure 9:
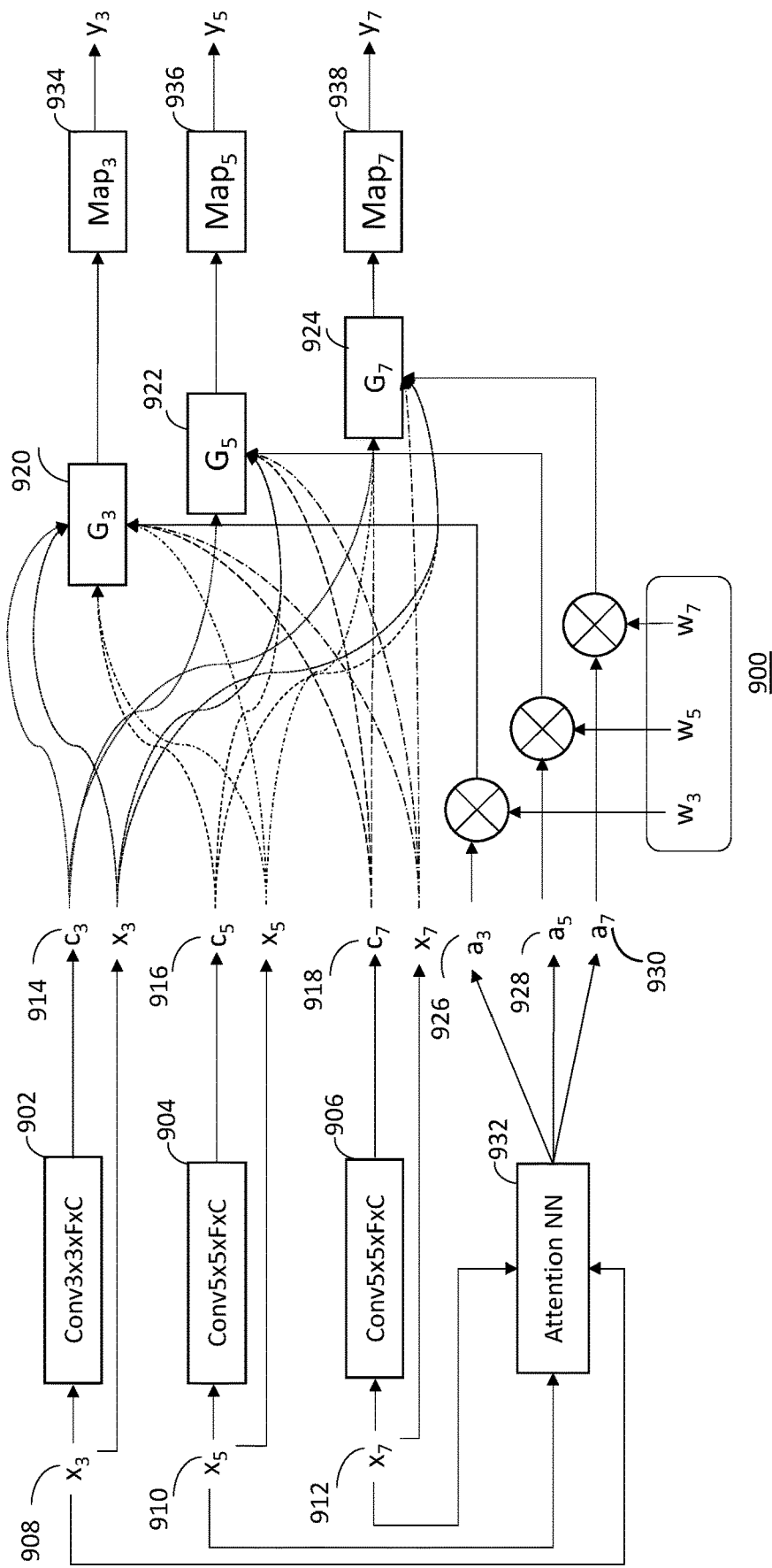
FIG. 9 depicts an architecture of one of the blocks or components designed to be used in a Decoder NN, in accordance with an embodiment.

FIG. 9 depicts an architecture 900 of block or circuits designed to be used in a decoder NN, in accordance with an embodiment. As an example, an architecture for each of these blocks or circuits, uses multiple parallel paths of computation of the input signals, where in each path a different kernel size is used for the convolutional layers. As an example, three paths are used in FIG. 9, where the kernel sizes of the convolutional layers in these three paths Conv3× 3×F×C 902, Conv5×5×F×C 904, and Conv7×7×F×C 906 are 3×3, 5×5, 7×7 respectively; where F represents number of input channels F and C represents number of output channels C. Inputs $X_3$ 908, $X_5$ 910, $X_7$ 912 to the parallel paths Conv3×3×F×C 902, Conv5×5×F×C 904, and Conv7×7× F×C 906 and their outputs $C_3$ 914, $C_5$ 916, and $C_7$ 918 are then combined together by attention or gating mechanism operations $G_3$ 920, $G_5$ 922, and $G_7$ 924. The inputs $X_3$ 908, $X_5$ 910, $X_7$ 912; and the outputs $C_3$ 914, $C_5$ 916, and $C_7$ 918 are feature maps, or feature tensors. The attention or gating mechanism multiplies these feature maps by the attention or gating matrices.

In an example, the gating mechanism may perform elementwise multiplications of one of inputs from their left with one of the inputs from their bottom side (for example, the attention matrices). The attention matrices $a_3$ 926, $a_5$ 928, and $a_7$ 930 are output by an AttentionNN 932, which is another neural network. The AttentionNN 932 may include a conv3×3: a convolutional layer with kernel size 3×3, a 'bn': batch-normalization layer, an 'lrelu': leaky rectified linear unit layer, a conv3×3: a convolutional layer with kernel size 3×3, a softmax: a softmax layer, which outputs an approximation of a probability distribution. A convolutional layer performs convolution operations by using a set of kernels. Batch-normalization performs normalization of the input signal based on statistics computed on a batches of data. Lrelu is a variant of Rectified Linear Unit, and it can be described by the function lrelu(x)=max(alpha*x,x), where alpha is a scalar value smaller than 1. Furthermore, in this proposed example, a set of attention or gating multipliers would multiply the attention or gating matrices $a_3$ 926, $a_5$ 928, and $a_7$ 930, and these multipliers are scalar values that would be used as overfitting parameters ($w_3$, $w_5$, and $w_7$) 933 in one of the embodiments. Several of such blocks or circuits would then be cascaded one after the other to form the decoder NN. Other suitable ways of using such blocks circuits in the decoder NN may be considered.

In an embodiment, the architecture 900 also includes a mapping blocks or circuits Map3 934, a mapping blocks or circuits Map5 936, and a mapping blocks or circuits Map7 938. These maps are neural network blocks or circuits which may include several layers. In this embodiment, one of such blocks or circuits may include: "conv1×1": a convolutional layer with kernel size 1×1, "pixelshuffle": a pixel-shuffle layer which performs upsampling, "bn": a batch-normalization layer, "lrelu": a leaky rectified linear unit layer. The function of the mapping blocks or circuits Map3 934, the mapping blocks or circuits Map5 936, and the mapping blocks or circuits Map7 938 is to map their input to a different number of channels and/or to a different spatial size, for example, by performing an upsampling operation via the pixelshuffle layer. $y_3$, $y_5$, $y_7$ represent the output of the mapping blocks or circuits Map3 934, Map5 936, and Map7 938, respectively.

The test or inference phase consists of two sub-phases, phase 1 is overfitting and phase 2 is final encoding. These phases are explained below.

Phase 1: Overfitting

Figure 10:
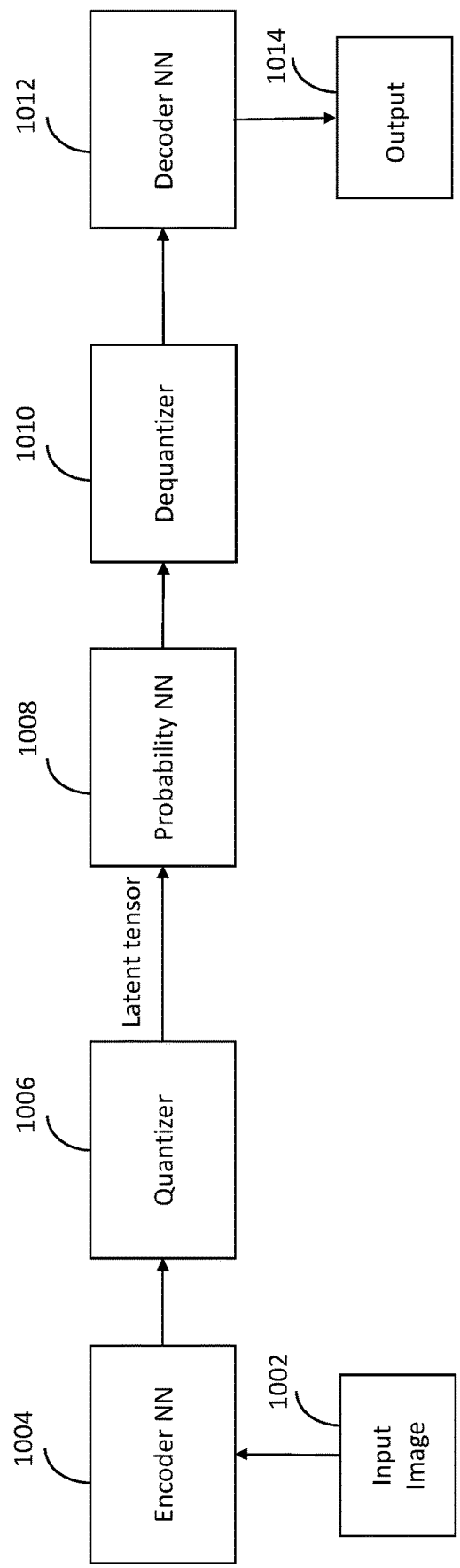
FIG. 10 is an example architecture, in accordance with an embodiment.

FIG. 10 is an example architecture, in accordance with an embodiment. Reference to FIG. 10 may be made to explain some aspects of overfitting. Overfitting is performed for a certain number of iterations. At each iteration, an input image 1002 is input to the encoding pipeline, such as an encoder NN 1004, and a quantizer 1006, to obtain a latent tensor. The latent tensor is then input to a probability NN 1008 used for lossless coding, and to the decoding pipeline, such as a dequantizer 1010 and a decoder NN 1012. In case of overfitting the latent tensor, the encoder NN 1004 is used only once at the beginning in order to obtain an initial version of the latent tensor which would then be updated by the overfitting process. The output of the probability NN 1008 may be used for computing a rate loss. An output 1014 of the decoder NN 1012 may be used for computing a reconstruction loss. These losses are then used for overfitting the selected Overfitting Parameters, for example by using gradient-descent and backpropagation.

In an embodiment, the number of overfitting iterations may depend on the available amount of time for overfitting, on the learning rate used for overfitting, and on the target performance that is desired. Higher learning rate may provide faster overfitting, and thus fewer overfitting iterations may be needed to achieve a desired target performance. However, too high learning rate may cause divergence and thus not good final performance. In an embodiment, a high learning rate may be, for example, 0.1, 1.0, 10, and the like; a low learning rate may be, for example, 0.001, 0.0001, and the like; and a too high learning rate may already be, for example, 0.1, 1.0, 10, and the like, and the term "too" refers to whether that learning rate would cause divergence of the training process.

In an example, be one of the following a criterion for stopping the overfitting: the loss does not decrease anymore or starts to increase, the available time for overfitting is over.

In case of overfitting some of the Decoder NN's parameters, a compression strategy may be used for encouraging the updates to the overfitted Decoder NN's parameters to require low bitrate when sending them to the decoder side. This may comprise using an additional loss term during overfitting, or a quantization operation, which are applied on the updates to the overfitted Decoder NN's parameters. Examples of such loss terms, include but are not limited to, loss terms that encourage the updates to have low entropy, or high sparsity, or be robust to quantization, such as L1 norm of the bias updates, or L2 norm of the bias updates, or L1 norm divided by L2 norm of the bias updates. In case of quantization, a differentiable approximation of a quantizer may be used, such as a quantizer based on Straight-Through Estimator.

In one embodiment, in case of overfitting some of the Decoder NN's parameters, for example the bias terms, two stages of overfitting may be performed at inference time. The first overfitting stage would perform the overfitting of the bias terms for a certain number of iterations. Then, the overfitted bias terms that have changed more than a predefined threshold during overfitting are selected and marked. Subsequently, the bias terms are reset to their original values before overfitting. In a second overfitting stage, the selected and marked bias terms are overfitted whereas other bias terms are left unmodified. In an alternative or additional embodiment, a predetermined percentage may be considered for selecting the overfitted bias terms. For example, the overfitted bias terms may be ranked or ordered according to descending amount of change due to overfitting, then the top 'TB' bias terms are selected. TB may be computed as follows:

$$TB=\text{round}((NB/100)*PB), \text{where:}$$

round is a rounding function;

NB is the total number of overfitted biases; and

PB is the predetermined percentage.

In one embodiment, multiple versions or sets of the Overfitting Parameters are overfitted for the same image or video, where each version is overfitted on one or more different portions of the image or video, for example, on different spatial areas of an image or video and/or on different frames of a video. Considering the example of an image, the image may be divided into patches or blocks, for example uniformly or by using a segmentation technique such as super-pixels. Then, the patches are clustered into a predetermined or automatically determined number of clusters 'N'. The patches in the same cluster are used for overfitting one set of Overfitting Parameters. Patches from different clusters are used for overfitting different sets of Overfitting Parameters. As a result, for each cluster, a version or set of Overfitting Parameters is obtained. Accordingly, 'N' different sets or versions of Overfitting Parameters are obtained, for example, one set for each cluster.

In another embodiment, multiple versions of the Overfitting Parameters are overfitted for the same image or video, where each version is obtained by first overfitting the Overfitting Parameters on different portions of the image or video, and then clustering the overfitted Overfitting Parameters into a predetermined or automatically determined number of clusters 'N'. Considering the example of an image, the image may be divided into patches or blocks, for example, uniformly or by using a segmentation technique such as super-pixels. Then, one or more patches are used for overfitting the Overfitting Parameters. This may be repeated for some or all the patches in the image, thus obtaining several initial versions of overfitted Overfitting Parameters, for example one initial version of overfitted Overfitting Parameters for each patch in the image. Subsequently, some or all the initial versions of the overfitted Overfitting Parameters are clustered into 'N' clusters, thus obtaining a version of overfitted Overfitting Parameters for each cluster.

In one embodiment, multiple versions or sets of the Overfitting Parameters are overfitted for the same image or video, where each version is obtained by first overfitting on one or more patches of the image, obtaining the initial version of overfitted Overfitting Parameters for that one or more patches, and then assigning a cluster label to the overfitted Overfitting Parameters, based on a predetermined set of cluster labels and cluster centroids. This may be repeated for some or all patches, thus obtaining a set of cluster labels as a result, for example, one cluster label for each set of overfitted Overfitting Parameters.

The assignment to a cluster or cluster label may be performed based on a predetermined distance function, so that a set of overfitted Overfitting Parameters is assigned to the i-th cluster label CL_i if the distance between that set of overfitted Overfitting Parameters and the cluster centroid associated to the i-th cluster label CL_i is minimized over all the cluster centroids. In this embodiment, the encoder side needs to signal to the decoder side one cluster label for each set of overfitted Overfitting Parameters, for example one cluster label for each patch of the image.

The cluster centroids and associated cluster labels may have been determined during the training phase or after the training phase. For example, after the training phase has been completed, a dataset such as the training dataset or a validation dataset may be used for overfitting the Overfitting Parameters, where one initial set or version of overfitted Overfitting Parameters is obtained for each portion of the content. For example, in the case of images, one initial set or version of overfitted Overfitting Parameters may be obtained for each patch in each image in the dataset. As a result, multiple sets, or versions of overfitted Overfitting Parameters may be obtained. These multiple sets are then clustered into 'N' clusters, for example by using K-means clustering algorithm. As a result of the clustering process, a set of cluster centroids and associated cluster labels is obtained.

In one embodiment, multiple versions or sets of the Overfitting Parameters are obtained for the same image or video, where each version is obtained for one or more patches of the image by assigning a suitable version or set of Overfitting Parameters out of several available versions or sets of Overfitting Parameters. In an example, the suitable version or set includes a most suitable version or set Overfitting Parameters. Determining which version or set of Overfitting Parameters is the most suitable to the considered one or more patches may comprise evaluating the performance of the codec when utilizing a certain version or set of Overfitting Parameters, repeating this evaluation for some or all of the versions or sets of Overfitting Parameters, comparing the performance results and selecting the version or set of Overfitting Parameters that provides the best performance result.

The available versions or sets of Overfitting Parameters may be represented as cluster centroids, which are the results of some previous clustering process. Accordingly, assigning the most suitable version or set of Overfitting Parameters corresponds to assigning a cluster label to the considered one or more patches of the image. This may be repeated for some or all patches, thus obtaining a set of cluster labels as a result, for example, one cluster label for each patch of the image.

The assignment to a cluster or cluster label may be performed based on a predetermined distance function, so that a set of overfitted Overfitting Parameters is assigned to the i-th cluster label CL_i if the distance between that set of overfitted Overfitting Parameters and the cluster centroid associated to the i-th cluster label CL_i is minimized over all the cluster centroids. In this embodiment, the encoder side needs to signal to the decoder side one cluster label for each set of overfitted Overfitting Parameters, for example one cluster label for each patch of the image.

The cluster centroids and associated cluster labels may have been determined during the training phase or after the training phase. For example, after the training phase has been completed, a dataset such as the training dataset or a validation dataset may be used for overfitting the Overfitting Parameters, where one initial set or version of overfitted Overfitting Parameters is obtained for each portion of the content. For example, in the case of images, one initial set or version of overfitted Overfitting Parameters may be obtained for each patch in each image in the dataset. As a result, multiple sets, or versions of overfitted Overfitting Parameters may be obtained. These multiple sets are then clustered into 'N' clusters, for example by using K-means clustering algorithm. As a result of the clustering process, a set of cluster centroids and associated cluster labels is obtained.

Phase 2: Final Encoding

The overfitted model from Phase 1 is used for encoding the input image. In case the OPs were the Encoder NN's parameters only, the input image is input to the Encoder NN, quantized and arithmetic-encoded. In case the OPs were the latent tensor, one of the latent tensors obtained before stopping the overfitting may be quantized and then arithmetic encoded. In case the OPs were some of the Decoder NN's parameters, the encoded latent tensor and the overfitted decoder's parameters would be both part of the encoded data to be sent to the decoder-side, where the overfitted decoder's parameters may comprise one or more of the following possible options: the overfitted decoder's parameters, a compressed version of the overfitted decoder's parameters, an update to the decoder's parameters, a compressed version of an update to the decoder's parameters, a cluster label, a compressed version of cluster label. Compression of the decoder's parameters or of an update to the decoder's parameters or of cluster labels may comprise one or more of sparsification, quantization and entropy encoding.

In one embodiment, a cluster label may be signaled to the decoder as a natural number that indexes a list of cluster labels. For example, the patches in the image may be associated to a subset of all possible cluster labels, where all possible cluster labels may comprise natural numbers for example from 0 to 100 and the subset may comprise the three natural numbers {1, 10, 130}, then the encoder may signal a first list of cluster labels indicating the subset S={1, 10, 13} for the whole image and a second list L of natural numbers where each number is associated to one or more patches and it indexes the first list. Accordingly, if a patch is associated to cluster label 10, then the natural number associated to that patch in the second list L is 1, and the cluster label may be derived at decoder side as S[1], assuming that indexes start from 0.

At decoder side, in case the OPs were some of the Decoder NN's parameters, the decoder device would use the set or version of Overfitting Parameters which was signaled by the encoder device. If the signaling comprises the overfitted decoder's parameters, then these parameters are used within the Decoder NN. If the signaling comprises an update to the decoder's parameters, then this update is applied to the Decoder NN's parameters. If the signaling comprises a cluster label, the decoder device selects the set or version of overfitted Overfitting Parameters that corresponds to the signaled cluster label, for example by using a look-up table that maps cluster labels to sets or versions of overfitted Overfitting Parameters. After selecting the set or version of overfitted Overfitting Parameters, these parameters are used with the Decoder NN. If the signaling information about the decoder Overfitting Parameters was compressed, such as quantized and entropy encoded, the decoder device may need to first decompress the information, such as entropy decode and dequantize the received data.

During development or training phase, after having selected the Overfitting Parameters, the neural networks of the codec are trained by using the proposed meta-learning procedure as part of the training procedure. The proposed training procedure may be used for training a randomly initialized neural network, or for training a neural network which has been previously trained by using any suitable training method, such as a more conventional training method that does not utilize meta-learning. In an embodiment, the training procedure may comprise following two nested loops:

Inner loop over images in the batch:
  Select a batch of B training images, a subset of images out of all available training images and perform a loop over these selected images.
  For each image with index b, perform an overfitting stage and an evaluation stage:
    Overfitting stage: partially-overfit the main model parametrized by parameters Theta_i, where i is the index of the outer loop iteration, on the given b-th image for a certain number of overfitting iterations (for example, 1 to 4 iterations). To this end, first perform a forward operation on the neural networks, compute a loss, which can be a sum of multiple losses, as already described, then compute derivatives of the loss with respect to the selected Overfitting Parameters, and then update the OPs by using the computed derivatives. As a result of the overfitting stage, a model with updated parameters, due to the overfitting of the Overfitting Parameters, is obtained, and the model may be referred to as parametrized by parameters Theta_i_b.
    Evaluation stage: evaluate the performance of the overfitted model parametrized by parameters Theta_i_b on that same b-th image, and obtain a loss.
  As a result, after considering all B images in the batch, B losses are obtained, one loss for each training image in the batch.
Outer loop over training data batches:
  Various embodiments refer to "main model" as the codec's NNs for which all parameters are the original ones as before the latest inner loop started, for the current iteration. For example, the main model's parameters are updated only in the outer loop. Refer to the main model at the i-th outer loop iteration as being parametrized by Theta_i.
  Update the main model based on the B losses from the inner loop's evaluation. To this end, compute the derivatives of the losses with respect to all the neural network's parameters, and then use these derivatives for updating the neural network's parameters. In an embodiment, the parameters updated in the main model and those updated in the inner loop's overfitting iterations may be different, and may be either overlapping sets of parameters or non-overlapping/disjoint sets of parameters. For example, if the OPs are the decoder NN's biases, those biases would be updated in both the inner loop and the outer loop, and the outer loop would update also all other neural networks' parameters, Encoder NN's parameters and the other Decoder NN's parameters. In another example, if the OPs are the latent tensor, then this tensor is updated in the inner loop whereas the outer loop would update the neural networks' parameters, thus the two sets are disjoint. This aspect determines whether second order derivatives can be used or not. This is explained in detail in further embodiments.

In the following, several embodiments are described. These embodiments relate to the choice of the Overfitting Parameters and its effect to the training and inference procedures. Any combination of the following embodiments may be possible, which would result into overfitting different types of Overfitting Parameters.

Embodiment 1: Overfitting the Encoder NN

In this embodiment, the OPs are some or all of the Encoder NN's parameters. The overfitting iterations performed in the inner loop of the meta-learning and during the test phase comprise the following steps:

1. Input the image to the encoding pipeline, obtaining a latent tensor. The latent tensor may be for example the quantized latent tensor.
2. Input the latent tensor to the probability NN and to the decoding pipeline.
3. Obtain a loss comprising rate loss and reconstruction loss
4. Compute derivatives of the loss with respect to the selected OPs in the Encoder NN.
5. Update the OPs.
6. Repeat from step 1, using the updated OPs in the Encoder NN.

The following steps refer to the training or development phase. At the end of the overfitting iterations in the inner loop, the outer loop operations are performed, consisting of the following steps:

1. Compute an evaluation loss, which comprises rate losses and reconstruction losses, using the updated OPs from the overfitting iterations.
2. Compute gradients of the evaluation loss with respect to some or all the neural networks (NNs) parameters, for example, the Decoder NN's, the Encoder NN's and the probability NN's parameters. The OPs, Encoder NN's parameters, are updated both in the outer loop and in the inner loop, therefore, in the outer loop, the derivatives of the loss with respect to the OPs may be computed as either first order or second order derivatives, and it is a choice of the designer of the codec. Other non-OPs parameters, for example, probability NN's and Decoder NN's parameters may be updated using first order derivatives.
3. Use these computed gradients to update NNs parameters, for example, all NNs parameters.

Embodiment 2: Method 1 for Overfitting the Latent Tensor

In Method 1 outer loop of meta-learning does not update the encoder. In this embodiment, the OPs are the latent tensor. In this embodiment, an output of the Encoder NN, before being quantized, is considered as an example latent tensor. In an embodiment, the training procedure is divided into two alternate steps. In the first alternate step, a normal training iteration on a batch of images is performed, and the Encoder NN's parameters and the Decoder NN's parameters are updated normally, for example, no meta-learning is performed. In the second alternate step, a meta-learning is performed. The first step is needed because the Encoder NN is not being trained in the second step. However, in another embodiment where the Encoder NN has already been trained for example by using a conventional training approach, for example without considering meta-learning, the first of the two alternate steps may be skipped. The overfitting iterations performed in the inner loop of the meta-learning and during the test phase comprise the following steps:
1. Input the image to the encoding pipeline, obtaining a latent tensor. This operation is done for the first overfitting iteration, in order to obtain a latent tensor, for example, an initial latent tensor.
2. Input the latent tensor to the probability NN and to the decoding pipeline.
3. Obtain a loss comprising rate loss and reconstruction loss
4. Compute derivatives of the loss with respect to the latent tensor.
5. Update the latent tensor, for example by using gradient descent update technique.
6. Repeat from step 2, using the updated latent tensor.

At the end of the overfitting iterations in the inner loop, the outer loop operations are performed, consisting of the following steps:
1. Compute an evaluation loss, which comprises rate losses and reconstruction losses, using the updated OPs from the overfitting iterations.
2. Compute gradients of the evaluation loss with respect to the Decoder NN's and probability NN's parameters. As the OPs, latent tensor, are updated only in the inner loop (and thus the set of OPs is disjoint from the set of Decoder NN's and probability NN's parameters), the derivatives computed in the outer loop are first order derivatives.
3. Update the Decoder NN's parameters and the probability NN's parameters by using the computed gradients, for example by using gradient descent update technique.

Embodiment 3: Method 2 for Overfitting the Latent Tensor

In method 2, the outer loop of meta-learning updates also the encoder. In this embodiment, the OPs are the latent tensor. In this embodiment, the output of the Encoder NN, before being quantized, is considered as an example latent tensor. The overfitting iterations performed in the inner loop of the meta-learning and during the test phase comprise the following steps:
1. Input the image to the encoding pipeline, obtaining a latent tensor. This operation is done for the first overfitting iteration, in order to obtain a latent tensor, for example an initial latent tensor.
2. Input the latent tensor to the probability NN and to the decoding pipeline.
3. Obtain a loss comprising rate loss and reconstruction loss.
4. Compute derivatives of the loss with respect to the latent tensor.
5. Update the latent tensor, for example by using gradient descent technique.
6. Repeat from step 2, using the updated latent tensor.

At the end of the overfitting iterations in the inner loop, the outer loop operations are performed, consisting of the following steps:
1. Compute an evaluation loss, which may comprise rate losses and reconstruction losses, using the updated OPs from the overfitting iterations.
2. Compute gradients of the evaluation loss with respect to the NNs parameters, for example, Encoder NN's, probability NN's, and Decoder NN's parameters. Although the OPs, for example, latent tensor, are updated in the inner loop (and thus OPs and NNs parameters are disjoint sets), computing gradients of the loss with respect to the Encoder NN's parameters may require computing second order derivatives with respect to the OPs, for example, latent tensor), because the latent tensor is output by the Encoder NN.
3. The outer loop updates neural networks (NNs) parameters by using the computed gradients, for example by using gradient descent technique.

Embodiment 4: Method 3 for Overfitting the Latent Tensor

In method 3, Encoder NN is not used. In this embodiment, the OPs are the latent tensor. In this embodiment, input tensor to the quantization is considered as an example latent tensor. In this embodiment, no Encoder NN is present. Instead, a single latent tensor, to be used as the starting point for overfitting on an image, is learned during training phase. At the beginning of the training, the latent tensor may be randomly initialized, or may be initialized by using any other suitable method. The overfitting iterations performed in the inner loop of the meta-learning and during the test phase comprise the following steps:
1. Input the latent tensor to the probability NN and to the decoding pipeline.
2. Obtain a loss comprising rate loss and reconstruction loss.
3. Compute derivatives of the loss with respect to the latent tensor.
4. Update the latent tensor, for example by using the gradient descent technique.
5. Repeat from step 1, using the updated latent tensor.

At the end of the overfitting iterations in the inner loop, the outer loop operations are performed, consisting of the following steps:
1. Compute an evaluation loss, which comprises rate losses and reconstruction losses, using the updated OPs from the overfitting iterations.
2. Compute gradients of the evaluation loss with respect to the OPs, the Decoder NN's parameters and the probability NN's parameters. As the OPs are updated both in the inner loop and in the outer loop, the derivatives computed in the outer loop with respect to the OPs may be computed as either first order derivatives or second order derivatives, and it is a choice of the designer of the codec. The derivatives of the loss with respect to the Decoder NN's parameters and the probability NN's parameters are first order derivatives.
3. The outer loop updates the Decoder NN's parameters and the probability NN's parameters by using the computed gradients, for example by gradient descent technique.

Embodiment 5: Overfitting a Subset of Decoder's Layers Parameters

In this embodiment, the OPs are a subset of the Decoder NN's parameters. One example is the bias terms of the convolutional layers and/or of the fully-connected layers in the decoder. Another example is the attention or gating multipliers for blocks or circuits using attention or gating mechanisms. Another example is a vector from which bias terms are derived by multiplying the vector by a matrix at decoder side. The overfitting iterations performed in the inner loop of the meta-learning and during the test phase comprise the following steps:
1. Input the image to the encoding pipeline, obtaining a latent tensor.
2. Input the latent tensor to the probability NN and to the decoding pipeline.
3. Obtain a loss comprising rate loss and reconstruction loss. However, in most cases, it may not be necessary to consider the rate loss when overfitting decoder-side parameters, because the rate loss can only be used for updating parameters that affect the input to the probability NN, such as Encoder NN's parameters and the latent tensor.
4. Compute derivatives of the loss with respect to the selected OPs in the Decoder NN.
5. Update the OPs, for example by using gradient descent technique. In one embodiment, the updated OPs or the update to the OPs may be lossy compressed, for example by quantizing the difference between the OPs before the overfitting iteration and the OPs after the overfitting iteration.
6. Repeat from step 1, using the updated OPs in the Decoder NN. If a lossy compression was performed on the updated OPs or on the update to the OPs, in the next iteration consider the compressed OPs or the compressed update to the OPs.

In one embodiment, one or more of the inner loop overfitting iterations may perform a lossy compression of the updated OPs or of the update to the OPs. For example, once the OPs have been updated, the OPs update may be sparsified and/or quantized. Then, the compressed OPs update may be used to update the original OPs before the overfitting iteration, so that the OPs are updated by using the compressed OPs update. In one embodiment, in order to render the OPs more robust to compression effects, one or more of the inner loop overfitting iterations may additionally use a strategy for making the updates of the OPs more compressible or more robust to compression. For example, the loss used during overfitting may include an additional loss term that encourages OP updates to be more compressible, such as loss terms that encourage sparse OP updates, or loss terms that encourage quantized OP updates, or loss terms that encourage OP updates with low entropy.

In one embodiment, a strategy for first selecting a subset of OPs and then overfitting only that subset may be used. One example comprises performing one or more overfitting iterations on the whole set of OPs, selecting the subset of OPs which change more than a predefined threshold resetting the OPs to their values before the overfitting iterations, and then performing one or more overfitting iterations only on the selected subset of OPs.

At the end of the overfitting iterations in the inner loop, the outer loop operations are performed, consisting of the following steps:
1. At the end of the overfitting iterations, compute an evaluation loss, which comprises rate losses and reconstruction losses, using the updated OPs from the overfitting iterations. In one embodiment, a compression step may be applied to the updated OPs or to the update of OPs, such as a sparsification step or a quantization step. Then, the compressed updated OPs or the OPs updated with the compressed OPs update are used for computing an evaluation loss.
2. Compute gradients of the evaluation loss with respect to some or all the NNs parameters. The OPs are updated in both the inner loop and the outer loop thus, in the outer loop, the derivatives of the loss with respect to the OPs may be computed as either first order or second order derivatives, and it is a choice of the designer of the codec. All other parameters (i.e., Encoder NN's parameters, Probability NN's parameters, and Decoder NN's non-OPs parameters) are updated using first order derivatives.
3. The outer loop updates some or all neural networks (NNs) parameters by using the computed gradients. For example, gradient descent may be used as the update technique.

Some experimental results are provided for the sake of comparison and should not be considered limiting.

Some of the proposed embodiments were evaluated by using an auto-encoder and MSE as a training objective. In these experiments, the number of overfitting iterations for both the inner loop of the meta-learning and for the inference phase was 4. This is a low number of iterations, but it is a suitable number to show the speed and effectiveness of overfitting. The learning rate (LR) was 0.001. The evaluation was performed on a subset of the CLIC 2019 dataset. The evaluated embodiments are:
Embodiment 1: OPs=Encoder NN's parameters
Embodiment 3: OPs=latent tensor, method 2
Embodiment 5: OPs=Decoder NN's biases.
Table below provides results of the evaluation:

| Overfitting type | Method | PSNR gain |
|---|---|---|
| Encoder's parameters | Baseline | 0.01079 |
| EEncoder's parameters | Embodiment 1 | 0.04534 |
| Latent tensor, method 2 | Baseline | 0.38732 |
| Latent tensor, method 2 | Embodiment 3 | 1.1168 |
| Decoder's biases | Baseline | 0.00064 |
| Decoder's biases | Embodiment 5 | 0.00415 |
| Decoder's biases, 20 iterations, inference LR = 0.1 | Baseline | 0.09988 |
| Decoder's biases, 20 iterations, inference LR = 0.1 | Embodiment 5 | 0.71910 |

Figure 11:
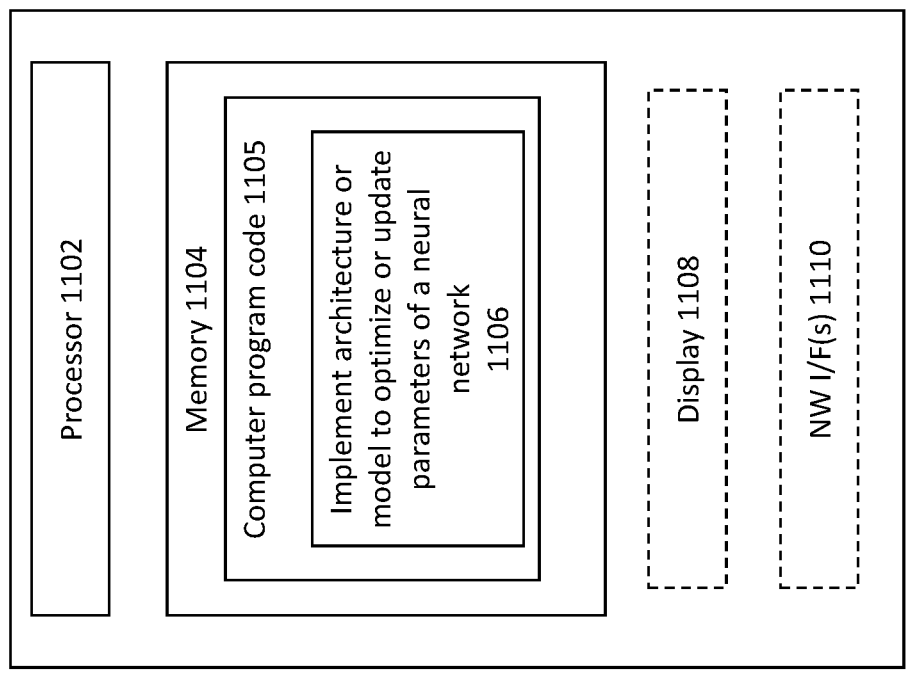
FIG. 11 is an example apparatus configured to implement an architecture or model to optimize or update parameters of neural network, in accordance with an embodiment.

FIG. 11 is an example apparatus 1100, which may be implemented in hardware, configured to implement a model or architecture to optimize or update parameters for a compressed representation of a neural network, based on the examples described herein. The apparatus 1100 comprises a processor 1102, at least one non-transitory memory 1104 including computer program code 1105, wherein the at least one memory 1104 and the computer program code 1105 are configured to, with the at least one processor 1102, cause the apparatus to implement a architecture or model to optimize or update parameters for a compressed representation of a neural network 1106 based on the examples described herein. The apparatus 1100 optionally includes a display 1108 that may be used to display content during rendering. The apparatus 1100 optionally includes one or more network (NW) interfaces (I/F(s)) 1110. The NW I/F(s) 1110 may be wired and/or wireless and communicate over the Internet/other network(s) via any communication technique. The NW I/F(s) 1110 may comprise one or more transmitters and one or more receivers.

Figure 12:
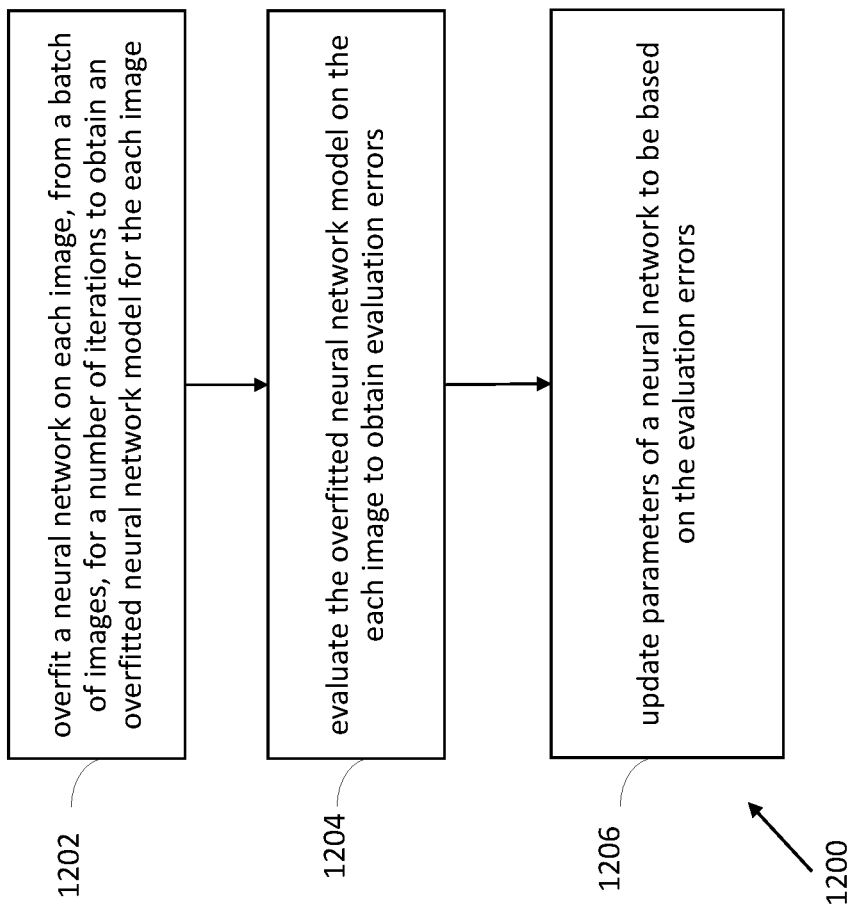
FIG. 12 is an example method to implement optimizing or updating parameters of a neural network.

FIG. 12 is an example method 1200 to implement a an example method to implement optimizing or updating parameters of a compressed representation of a neural network. At 1202, the method includes overfitting a neural network on each image, from a batch of images, for a number of iterations to obtain an overfitted neural network model for the each image. At 1204, the method includes evaluating the overfitted neural network model on the each image to obtain evaluation errors. At 1206, the method includes updating parameters of a neural network to be based on the evaluation errors.

Figure 13:
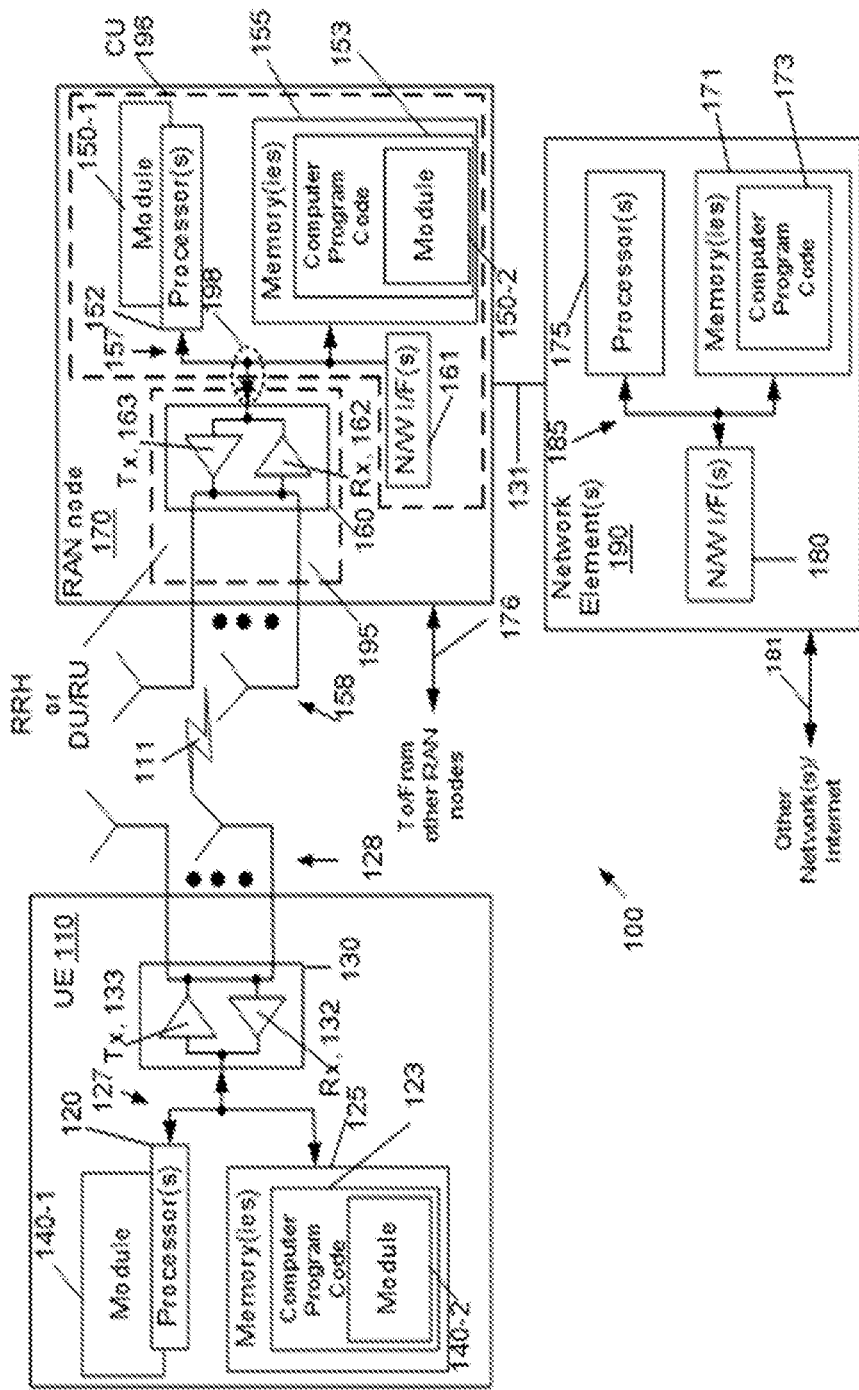
FIG. 13 is a block diagram of one possible and non-limiting system in which the example embodiments may be practiced.

Turning to FIG. 13, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory, and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement architecture or mode for optimizing or updating parameters of a compressed representation of a neural networks based on the examples described herein. Computer program code 173 may also be configured to implement architecture or mode for optimizing or updating parameters of a compressed representation of a neural networks based on the examples described herein.

An apparatus example apparatus includes processing circuitry; and at least one memory including computer program code, the at least one memory and the computer program code configured to, with the processing circuitry, cause the apparatus at least to: overfit a neural network on each media item, from a batch of media items, for a number of iterations to obtain an overfitted neural network model for the each media item; evaluate the overfitted neural network model on the each media item to obtain evaluation errors; and update parameters of a neural network to be based on the evaluation errors.

The example apparatus may further include, wherein the apparatus is further caused to perform a training iteration on the neural network based on the evaluation errors.

The example apparatus may further include, wherein the apparatus is caused to select overfitting parameters.

The example apparatus may further include, wherein the overfitting parameters comprise at least one of, encoder neural network parameters, output of the encoder neural network, output of a quantizer, or at least one decoder neural network parameters.

The example apparatus may further include, wherein the encoder neural network parameters comprise parameters of convolution layers, parameters of fully-connected layers, or parameters of a batch-normalization layer.

The example apparatus may further include, wherein the at least one decoder neural network parameters comprise at least one of one or more bias terms of convolution layers, bias terms of fully-connected layers in the decoder neural network, attention-multipliers in an instance an attention mechanism is used in an architecture of the decoder neural network, or a vector for deriving one or more bias terms by multiplying the vector by a weight matrix at a decoder side.

The example apparatus may further include, wherein the at least one decoder neural network parameters comprise at least one of one or more of a set of scalar values that act as gates or attention-multipliers in specifically designed blocks used in the decoder neural network.

The example apparatus may further include, wherein the training iteration comprises two stages, when the overfitting parameters comprise a latent tensor output by an encoder neural network, or a latent tensor output by a quantizer, and wherein the apparatus is further caused to perform the two stages.

The example apparatus may further include, wherein to perform the two stages, the apparatus is further caused to: run the encoder neural network or the quantizer to obtain an initial tensor; and perform a meta-learning by overfitting the initial latent tensor and update the neural network based on performance of latent tensor overfitting.

The example apparatus may further include, wherein the apparatus is further caused to select the batch of media items as a subset of training media items.

The example apparatus may further include, wherein to overfit the neural network, the apparatus is further caused to perform a forward operation on the neural network; compute loss based on the forward operation; compute derivatives of the loss based on the overfitting parameters; update the overfitting parameters based on the computed derivatives.

The example apparatus may further include, wherein the loss comprises a rate loss and reconstruction loss.

The example apparatus may further include, wherein to perform the overfitting, when the overfitting parameters are encoder neural network parameters, the apparatus is further caused to input the media item to an encoding pipeline to obtain a latent tensor; input the latent tensor to a probability neural network and to a decoding pipeline; obtain a loss comprising rate loss and reconstruction loss; compute a derivative of the loss based on the selected overfitting parameters in the encoder neural network; update the overfitting parameters based on the derivatives of the loss; and repeat preceding for the updated overfitting parameters for a predefined number of iterations.

The example apparatus may further include, wherein the apparatus is further caused to compute an evaluation loss comprising rate losses and reconstruction losses based on the updated overfitting parameters; compute gradients of the evaluation losses based on neural network parameters; and use the computed gradients to update the neural network parameters, wherein the evaluation errors comprise the computed gradients.

An another example apparatus includes processing circuitry; and at least one memory including computer program code, the at least one memory and the computer program code configured to, with the processing circuitry, cause the apparatus at least to input a latent tensor to a probability neural network and to a decoding pipeline; obtain a loss comprising a rate loss and a reconstruction loss; compute derivatives of the loss based on the latent tensor; update the latent tensor; and repeat the preceding operations for the updated latent tensor for a predefined number of iterations.

The example apparatus may further include, wherein the apparatus is further caused to input a media item to an encoding pipeline to obtain the latent tensor.

The example apparatus may further include, wherein the apparatus is further caused to: compute an evaluation loss comprising rate losses and reconstruction losses based on the updated latent tensors; compute gradients of the evaluation loss based on decoder neural network parameters and probability neural network parameters; and update the decoder neural network parameters and the probability neural network parameters based on the computed gradients.

The example apparatus may further include, wherein the apparatus is further caused to compute the gradients of the evaluation loss further based on encoder neural network parameters; and update the encoder neural network parameters based on the computed gradients.

The example apparatus may further include, wherein to compute the gradients of the evaluation loss, the apparatus is further caused to compute a second order derivatives based on the latent tensor.

The example apparatus may further include, wherein the apparatus is further caused to: compute an evaluation loss comprising rate losses and reconstruction losses based on the updated latent tensors; compute gradients of the evaluation based on decoder neural network parameters, and probability neural network parameters; and update the decoder neural network parameters and the probability neural network parameters based on the computed gradients.

A yet another example apparatus includes processing circuitry; and at least one memory including computer program code, the at least one memory and the computer program code configured to, with the processing circuitry, cause the apparatus at least to input a media item to an encoding pipeline to obtain a latent tensor; input the latent tensor to a probability neural network and to a decoding pipeline; obtain a loss comprising at least one of a rate loss or a reconstruction loss; compute derivatives of the loss based on a subset of overfitting parameters of a decoder neural network; update the subset of the overfitting parameters of the decoder neural network; and repeat, for a predefined number of iterations, the preceding operations for the updated subset of the overfitting parameters of the decoder neural network.

The example apparatus may further include, wherein the apparatus is further caused to compress the updated subset of the overfitting parameters of the decoder neural network.

The example apparatus may further include, wherein the apparatus is further caused to: compute an evaluation loss comprising rate losses and reconstruction losses based on the subset of overfitting parameters of the decoder neural network and the updated subset of the overfitting parameters; compute gradients of the evaluation loss based on the subset of the overfitting parameters of the decoder neural network parameters, encoder neural network parameters, and probability neural network parameters; and update the decoder neural network parameters, encoder neural network parameters, and the probability neural network parameters based on the computed gradients.

The example apparatus may further include, wherein the apparatus is further caused to compute the gradients of the evaluation loss further based on the decoder neural network parameters; wherein the computed gradients comprise computing a second-order derivatives; and update the decoder neural network parameters based on the computed gradients.

The example apparatus may further include, wherein the apparatus is further caused to select the subset of the overfitting parameters of the decoder neural network, and wherein the selected subset of the overfitting parameters of the decoder neural network comprises at least one of bias terms of convolution layers, bias terms of fully-connected layers, or attention multiplier for blocks using attention mechanisms.

A still another example apparatus includes processing circuitry; and at least one memory including computer program code, the at least one memory and the computer program code configured to, with the processing circuitry, cause the apparatus at least to perform following for a predefined number iterations provide an input media item to an encoding pipeline to obtain a latent tensor, wherein the coding pipeline comprises at least one of an encoder neural network or a quantizer; provide the latent tensor to a probability neural network used for lossless coding; and provide the latent tensor to a decoding pipeline, wherein the decoding pipeline comprises dequantizer and a decoder neural network;
  compute a loss comprising a rate loss and a reconstruction loss, wherein the rate loss is based on an output of the probability neural network, and wherein the reconstruction loss is based on output of the decoder neural network; and
  perform overfitting on overfitting parameters based on the loss to obtain an overfitted model.

The example apparatus may further include, wherein the apparatus is further caused to use the encoder neural network once in an instance the overfitting parameters comprises the latent tensor.

The example apparatus may further include, wherein the predefined number of iterations is based on at least one of: time available to overfit the overfitting parameters, learning rate use to overfit the overfitting parameters, or a target performance desired.

The example apparatus may further include, wherein the apparatus is further caused to determine a stop criterion to stop overfitting on the overfitting parameters, wherein the stop criterion comprises the loss not decreasing, the loss starts to increase, or an available time for overfitting is over.

The example apparatus may further include, wherein to stop the overfitting, in an instance the overfitting parameters comprise the latent tensor, the apparatus is further caused to provide a latent tensor, obtained prior to stopping the overfitting, to the quantizer and an arithmetic encoder.

The example apparatus may further include, wherein the apparatus is further caused to perform encoding of the input media item based on the overfitted model.

The example apparatus may further include, wherein to encode the input media item, in an instance the overfitting parameters comprise encoder neural parameters, the apparatus is further caused to provide the input media item to the encoder neural network, the quantizer, and an arithmetic encoder.

The example apparatus may further include, wherein to encode the input media item, in an instance the overfitting parameters comprise one or more decoder neural network parameters, the apparatus is further caused to encode: the latent tensor and the one or more overfitted decoder neural network parameters; or the latent tensor and updates to the one or more overfitted decoder parameters.

The example apparatus may further include, wherein the apparatus is further caused to provide the latent tensor and the one or more overfitted decoder neural network parameters; or the latent tensor and updates to the one or more overfitted decoder parameters to a decoder pipeline.

The example apparatus may further include, wherein the apparatus is further caused to perform at least one of quantize or entropy encode the one or more overfitted decoder neural network parameters.

The example apparatus may further include, wherein, in an instance the overfitting parameters comprise one or more decoder neural network parameters, the apparatus is further caused to determine at least one parameter of the one or more decoder neural network parameters that have changed more than a predefined threshold during the overfitting; reset each of the one or more decoder neural network parameters to an initial value of the each of the one or more neural network parameters; and perform the overfitting for the at least one parameter.

The example apparatus may further include, wherein, in an instance the overfitting parameters comprise one or more decoder neural network parameters, the apparatus is further caused to rank or order the one or more decoder neural network parameters based on an amount the one or more decoder neural network changed during the overfitting; select at least one parameter of the one or more decoder neural network parameters based on a predetermined percentage; reset each of the one or more decoder neural network parameters to an initial value of the each of the one or more neural network parameters; and perform the overfitting for the at least one parameter.

The example apparatus may further include, wherein the overfitting parameters comprises a plurality of sets or versions of overfitting parameters.

The example apparatus may further include, wherein the apparatus is further caused to perform the overfitting based on the plurality of sets or versions of overfitting parameters for the input media item.

The example apparatus may further include, wherein each set or version is overfitted on one or more portions of the input media item.

The example apparatus may further include, wherein to perform the overfitting, the apparatus is further caused to divide the input media item into a plurality of patches; clustering the plurality of patches into 'N' clusters, wherein 'N' is a predetermined or an automatically determined natural number; and using patches in each cluster to overfit a distinct set or version of overfitting parameters, whereby obtaining 'N' distinct sets or versions of overfitting parameters.

The example apparatus may further include, wherein to perform the overfitting, the apparatus is further caused to: divide the input media item into a plurality of patches; repeatedly perform, for at least one patch of the plurality of patches: using one or more patches of the at least one patch to overfit the overfitting parameters; obtain a plurality of initial versions of the overfitted overfitting parameters, an initial version of the overfitted overfitting parameters is obtained for each patch of the at least one patch; cluster one or more initial versions of the plurality of initial versions of the overfitting parameters to obtain 'N' clusters, wherein 'N' is a natural number, and wherein a distinct initial version of overfitted overfitting parameters is obtained for each cluster.

The example apparatus may further include, wherein to perform the overfitting, the apparatus is further caused to divide the input media item into a plurality of patches; repeatedly perform, for at least one patch of the plurality of patches obtain an initial set or version of overfitted overfitting parameters for one or more patches of the at least patch; and assign a cluster label to initial version of the overfitted overfitting parameters, based a predetermined set of cluster labels and cluster centroids; and obtain a set of cluster labels, wherein the set of cluster labels comprises a cluster label for each initial set or version of overfitted parameters.

The example apparatus may further include, wherein the cluster label is assigned based on predetermined distance function.

The example apparatus may further include, wherein the apparatus is caused to signal the set of cluster labels to a decoding pipeline.

The example apparatus may further include, wherein to assign a cluster label to at least one patch of the plurality of patches the apparatus is further caused to perform assign a suitable version or set of the overfitted overfitting parameters from the plurality of versions or sets of the overfitted overfitting parameters.

The example apparatus may further include, wherein to assign the suitable initial version or set of the overfitted overfitting parameters, the apparatus is further caused to perform determine the suitable initial version or set of the overfitted overfitting parameters.

The example apparatus may further include, wherein to determine the suitable initial version or set of the overfitted overfitting parameters, the apparatus is further caused to perform evaluate performance of a codes by utilizing one or more versions or sets of the overfitted overfitting parameters; compare results of evaluation; and select a version or a set of overfitted overfitting parameters providing better result compared to a predetermined threshold result.

The example apparatus may further include, wherein the media item comprises at least one of images, videos, or audio data.

An example method includes overfitting a neural network on each media item, from a batch of media items, for a number of iterations to obtain an overfitted neural network model for the each media item; evaluating the overfitted neural network model on the each media item to obtain evaluation errors; and updating parameters of a neural network to be based on the evaluation errors.

An example non-transitory program storage device readable by a machine, tangibly embodying a program of instructions executable by the machine for performing operations, the operations includes overfitting a neural network on each media item, from a batch of media items, for a number of iterations to obtain an overfitted neural network model for the each media item; evaluating the overfitted neural network model on the each media item to obtain evaluation errors; and updating parameters of a neural network to be based on the evaluation errors.

A still another example apparatus includes means for overfitting a neural network on each media item, from a batch of media items, for a number of iterations to obtain an overfitted neural network model for the each media item; means for evaluating the overfitted neural network model on the each media item to obtain evaluation errors; and means for updating parameters of a neural network to be based on the evaluation errors.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
at least one processor; and
at least one memory storing instructions that, when executed by the at least one processor, cause the apparatus at least to:
overfit a neural network on each media item, from a batch of media items, for a number of iterations to obtain an individual overfitted neural network model for each media item in the batch of media items, wherein to overfit the neural network, the following are performed:
selecting overfitting parameters;
performing a forward operation on the neural network;
computing loss based on the forward operation;
computing derivatives of a loss based on the selected overfitting parameters; and
updating the selected overfitting parameters based on the computed derivatives;
evaluate individual overfitted neural network models on a corresponding media item to obtain evaluation errors; and
update parameters of the neural network based on the evaluation errors.

2. The apparatus of claim 1, wherein the at least one memory stores instructions that, when executed by the at least one processor, cause the apparatus at least to perform a training iteration on the neural network based on the evaluation errors.

3. The apparatus of claim 2, wherein the training iteration comprises two stages, when overfitting parameters comprise a latent tensor output by an encoder neural network, or the latent tensor output by a quantizer, and wherein the at least one memory stores instructions that, when executed by the at least one processor, cause the apparatus at least to perform the two stages.

4. The apparatus of claim 1, wherein the overfitting parameters comprise at least one of the following: encoder neural network parameters, output of an encoder neural network, output of a quantizer, or at least one decoder neural network parameter.

5. The apparatus of claim 4, wherein the encoder neural network parameters comprise parameters of convolution layers, parameters of fully-connected layers, or parameters of a batch-normalization layer.

6. The apparatus of claim 4, wherein the at least one decoder neural network parameter comprises at least one of one or more bias terms of convolution layers, bias terms of fully-connected layers in a decoder neural network, attention-multipliers in an instance an attention mechanism is used in an architecture of the decoder neural network, or a vector for deriving one or more bias terms by multiplying the vector by a weight matrix at a decoder side.

7. The apparatus of claim 4, wherein the at least one decoder neural network parameter comprises at least one of one or more of a set of scalar values that act as gates or attention-multipliers in specifically designed blocks used a decoder neural network.

8. The apparatus of claim 4, wherein to perform the overfitting when the overfitting parameters comprise the encoder neural network parameters, the at least one memory stores instructions that, when executed by the at least one processor, cause the apparatus at least to:
input the media item to an encoding pipeline to obtain a latent tensor;
input the latent tensor to a probability neural network and to a decoding pipeline;

obtain a loss comprising a rate loss and a reconstruction loss;

compute a derivative of the loss based on the selected overfitting parameters in the encoder neural network;

update the selected overfitting parameters based on derivatives of the loss; and repeat preceding for updated overfitting parameters for a predefined number of iterations.

9. The apparatus of claim 8, wherein the at least one memory stores instructions that, when executed by the at least one processor, cause the apparatus at least to:

compute an evaluation loss comprising rate losses and reconstruction losses based on the updated overfitting parameters;

compute gradients of the evaluation loss based on neural network parameters; and use the computed gradients to update the neural network parameters.

10. The apparatus of claim 1, wherein the at least one memory stores instructions that, when executed by the at least one processor, cause the apparatus at least to select the batch of media items as a subset of training media items.

11. The apparatus of claim 1, wherein a loss comprises a rate loss and reconstruction loss.

12. An apparatus comprising:
at least one processor; and
at least one memory storing instructions that, when executed by the at least one processor, cause the apparatus at least to:
overfit a neural network on each media item, from a batch of media items, for a number of iterations to obtain an individual overfitted neural network model for each media item in the batch of media items;
evaluate individual overfitted neural network models on a corresponding media item to obtain evaluation errors;
update parameters of the neural network based on the evaluation errors;
perform a training iteration on the neural network based on the evaluation errors;
wherein the training iteration comprises two stages, when overfitting parameters comprise a latent tensor output by an encoder neural network, or the latent tensor output by a quantizer, and wherein the at least one memory stores instructions that, when executed by the at least one processor, cause the apparatus to perform the two stages at least by:

running the encoder neural network or the quantizer to obtain an initial tensor; and performing a meta-learning by overfitting an initial latent tensor and update the neural network based on performance of latent tensor overfitting.

13. A method comprising:
overfitting a neural network on each media item, from a batch of media items, for a number of iterations to obtain an individual overfitted neural network model for each media item in the batch of media items, wherein to overfit the neural network, the following are performed:
selecting overfitting parameters;
performing a forward operation on the neural network;
computing loss based on the forward operation;
computing derivatives of a loss based on the selected overfitting parameters; and
updating the selected overfitting parameters based on the computed derivatives;
evaluating individual overfitted neural network models on a corresponding media item to obtain evaluation errors; and
updating parameters of the neural network based on the evaluation errors.

14. The method of claim 13, further comprising performing a training iteration on the neural network based on the evaluation errors.

15. The method of claim 13, wherein the overfitting parameters comprise at least one of the following: encoder neural network parameters, output of an encoder neural network, output of a quantizer, or at least one decoder neural network parameters.

16. The method of claim 15, wherein the encoder neural network parameters comprise parameters of convolution layers, parameters of fully-connected layers, or parameters of a batch-normalization layer.

17. The method of claim 15, wherein the at least one decoder neural network parameters comprise at least one of one or more bias terms of convolution layers, bias terms of fully-connected layers in a decoder neural network, attention-multipliers in an instance an attention mechanism is used in an architecture of the decoder neural network, or a vector for deriving one or more bias terms by multiplying the vector by a weight matrix at a decoder side.

* * * * *